(12) United States Patent  
McGrath et al.

(10) Patent No.: US 9,328,005 B2  
(45) Date of Patent: May 3, 2016

(54) DENITRIFICATION PROCESS

(75) Inventors: Michael B. McGrath, Falmouth, MA (US); Timothy Santos, Somerset, MA (US)

(73) Assignee: Holmes and McGrath, Inc., Falmouth, MA (US)

( * ) Notice: Subject to any disclaimer, the term of this patent is extended or adjusted under 35 U.S.C. 154(b) by 0 days.

(21) Appl. No.: 12/888,837

(22) Filed: Sep. 23, 2010

(65) Prior Publication Data

US 2011/0073544 A1    Mar. 31, 2011

Related U.S. Application Data

(60) Provisional application No. 61/245,974, filed on Sep. 25, 2009, provisional application No. 61/354,513, filed on Jun. 14, 2010.

(51) Int. Cl.
*C02F 3/28* (2006.01)
*C02F 3/04* (2006.01)
(Continued)

(52) U.S. Cl.
CPC . *C02F 3/04* (2013.01); *C02F 3/302* (2013.01); *C02F 1/66* (2013.01); *C02F 2101/16* (2013.01); *C02F 2103/06* (2013.01); *C02F 2305/06* (2013.01); *Y02W 10/15* (2015.05)

(58) Field of Classification Search
CPC ............ C02F 3/302; C02F 3/10; C02F 3/306; C02F 2305/06; C02F 3/06; C02F 3/046; B01D 24/12; B01D 39/1623
USPC ......... 210/610, 601, 615, 612, 611, 616, 617, 210/749, 175.7, 631
See application file for complete search history.

(56) References Cited

U.S. PATENT DOCUMENTS 4,465,594 A    8/1984 Laak
4,715,958 A *  12/1987 Fuchs ........................... 210/605
(Continued)

FOREIGN PATENT DOCUMENTS

DE          35 03 723 A1    8/1986
DE        198 43 967 A1    5/1999

OTHER PUBLICATIONS

Isaacs et al., Controlled Carbon Source Addition to an Alternating Nitrification-Denitrification Wastewater Treatment Process Including Biological P Removal, Technical University of Denmark, 1994, p. 77.*

(Continued)

*Primary Examiner* — Nam Nguyen
*Assistant Examiner* — Claire Norris
(74) *Attorney, Agent, or Firm* — Hamilton, Brook, Smith & Reynolds, P.C.

(57) ABSTRACT

A method of mixing organic carbon with the final effluent for water treatment systems and applying the mixture to manmade stratified sand filters or natural soils to induce proper conditions for high removal of total nitrogen in the final effluent. In one embodiment, water having a concentration less than about 30 mg/l of Total Nitrogen (TN) and a $BOD_5$ concentration of less than about 30 mg/l is mixed with a sufficient amount of dissolved carbon to cause a reduction of the nitrogen pollution in the water, and the water and dissolved carbon are percolated through a fixed bed.

A method of mixing organic carbon with any water having dissolved TN and applying the mixture to manmade stratified sand filters or natural soils to induce proper conditions for high removal of total nitrogen in the applied water.

A method of mixing organic carbon with any water having dissolved TN and applying the mixture to manmade stratified sand filters and applying the water to the soils and inducing in situ denitrification caused by the discharge of water having the proper Carbon to Nitrogen ratio for soil bacterial metabolism and by the discharge of long chained insoluble particular carbon, which degrades in the soils and soil water and provides carbon for denitrification.

8 Claims, 14 Drawing Sheets

(51) Int. Cl.
*C02F 3/30* (2006.01)
*C02F 1/66* (2006.01)
*C02F 101/16* (2006.01)
*C02F 103/06* (2006.01)

(56) References Cited

U.S. PATENT DOCUMENTS

| | | | |
|---|---|---|---|
| 4,732,679 A * | 3/1988 | Karlsson | 210/605 |
| 5,588,777 A | 12/1996 | Laak | |
| 5,958,239 A * | 9/1999 | Sing | 210/605 |
| 6,406,628 B1 * | 6/2002 | Chang et al. | 210/605 |
| 6,875,355 B2 | 4/2005 | McGrath et al. | |
| 7,081,203 B2 * | 7/2006 | Helm | 210/617 |
| 7,135,110 B2 * | 11/2006 | McGrath et al. | 210/198.1 |
| 7,144,509 B2 | 12/2006 | Boyd et al. | |
| 2005/0145563 A1 * | 7/2005 | Boyd et al. | 210/601 |
| 2006/0029472 A1 * | 2/2006 | Blackwood et al. | 405/36 |
| 2009/0026132 A1 | 1/2009 | Costa | |

OTHER PUBLICATIONS

Howard, Urban Groundwater, Meeting the Challenge: IAH selected Papers on Hydrogeology 8, Taylor and Francis Group, 2007, p. 172.*
Koch et al, "Denitrification with Methanol in Tertiary Filtration," 1997, Swiss Federal Institute for Environmental Science and Technology (EAWAG) and Swiss Federal Institute of Technology (ETH).*
Glover et al., Grian-size to effective pore-size transformation derived from electrokinetic theory, Geophysics vol. 74, Jan. 2009, p. E22.*
Rowe et al., Handbook of Wastewater Reclamation and Reuse, Lewis Publishers, 1995, p. 186.*
Silverstein, "Demonsstration of Biological Denitrification of Drinking Water for Rural Communities", 1997, Department of Civil Environmental and Architectural Engineering, University of Colorado, Boulder, pp. 1-93.*
Lukacs, "From Design to Implementation: Innovative Slow Sand Filtration for Use in Developing Countries," 2002, Civil an dEnvironmental Engineering, MIT, pagers 1-75.*
Nakhla et al, "Simultaneous nitrification—denitrification in slow sand filters," 2003, Journal of Hasardous Materials B96 pp. 291-303.*
Notification of Transmittal of the International Search Report and the Written Opinion of the International Searching Authority for Int'l Application No. PCT/US2010/049991; Date Mailed: Mar. 17, 2011.
Sison, N.F. et al., "Denitrification with External Carbon Source Utilizing Adsorption and Desorption Capability of Activated Carbon," Wat. Res., vol. 30, No. 1, pp. 217-227 (1996).
McGrath, M.B. and Santos, T.M., "Report of a Proprietary Process to reduce dissolved Total Nitrogen in the Final Effluent at a wastewater treatment system and in the Groundwater Downstream from a Soil Absorption system in a Coastal Outwash Plain." Paper No. 1110727, 2011 Louisville, Kentucky, Aug. 7-10, 2011. (doi: 10.13031/2013. 37289)@2011.
Aslan, S. and Cakici, H., "Biological denitrification of drinking water in a slow sand filter," *Journal of Hazardous Materials*, 148:253-258, (2007).
Nakhla, G. and Farooq, S., "Simultaneous nitrification-denitrification in slow sand filters," *Journal of Hazardous Materials* B96:291-303, (2003).

* cited by examiner

DENITRIFICATION PROCESS

RELATED APPLICATIONS

This application claims the benefit of U.S. Provisional Application No. 61/245,974, filed on Sep. 25, 2009, and U.S. Provisional Application No. 61/354,513, filed on Jun. 14, 2010.

The entire teachings of the above applications are incorporated herein by reference.

BACKGROUND OF THE INVENTION

Excessive concentrations of nitrate in water in the environment can cause health hazards and can cause accelerated eutrophication of estuarine waters. The Maximum Contaminant Level of nitrate in drinking water as established by the United States Environmental Protection Agency (EPA) is 10 milligrams per liter. Excessive concentrations of nitrate have been linked to methemoglobinemia or "blue baby" syndrome.

The treatment of wastewater easily removes almost all organic carbon from the treated fluid. Nitrogen is more difficult to remove from wastewater. The final effluent from wastewater treatment facilities usually has more nitrogen than carbon on a mass basis. The discharge of effluent with more nitrogen than carbon will create an environment in the soil regime and ground water that will allow the nitrogen to pass long distances in the ground water with minimal microbial attenuation. Nitrate is the limiting nutrient in salt water and estuarine systems. Dissolved nitrates in groundwater and surface waters draining to estuaries cause accelerated eutrophication of salt-water environments.

Nitrate is an inorganic form of nitrogen. Nitrate is the result of bacteria driven oxidation of organic nitrogen and ammonia in two steps. Initially, bacteria Nitrosonomas and other species oxidize ammonia ($NH_4$) into Nitrite ($NO_2^-$). The bacteria Nitrobacter and other species then oxidize Nitrite into Nitrate ($NO_3^-$). These bacteria are prevalent in all soils. These bacteria are slow growers and tend to take a long time to reach effective population density to provide complete nitrification of the organic nitrogen.

The removal of dissolved nitrate from water is called denitrification. Denitrification is a microbially driven reaction, in anoxic conditions, where an available carbon is present. The carbon has to be readily available or capable of being used readily by bacteria for metabolism. In anoxic conditions in waters, time, temperature, bacteria and available carbon limit denitrification. If there are sufficient conditions for denitrification, then the dissolved nitrate will be completely denitrified with the end products being free nitrogen gas, free carbon dioxide gas, dissolved organic nitrogen and dissolved organic carbon in the water and organic nitrogen and organic carbon in biomass. This biomass occurs as slime. The slime can result in biofouling in any voids if denitrification occurs in soils, packed bed filters or in sand filters.

There are several methods to induce the denitrification of wastewater. Regardless of the method chosen in the treatment process, there are measurable concentrations of Total Nitrogen (TN) in the final effluent. The final effluent always has dissolved organic nitrogen and dissolved inorganic nitrogen.

The removal of dissolved nitrogen in water will be described as the removal of TN. The concentration of TN is the total of the concentrations of Total Kjedlhal Nitrogen (TKN) plus $NO_2^-$ and $NO_3^-$. Dissolved organic nitrogen is described as TKN minus Ammonia ($NH_3$). TKN is defined as the total of ammonia concentrations and dissolved organic nitrogen concentrations. Inorganic nitrogen is measured as the total of the concentrations of ($NO_2^-$) and ($NO_3^-$) and $NH_3$. The value of TN then is the addition of $NO_2^-$ plus $NO_3^-$ plus TKN.

The removal of nitrogen has to be quantified as the removal of TN to account for all nitrogen compounds. For instance, denitrification of $NO_3^-$ will result in the discharge of low concentrations of TKN as a byproduct. This TKN will by microbially oxidized in the environment back into $NO_3^-$. As a result, nitrogen removal is quantified by measuring the difference in TN.

Bacteria in soil typically have a carbon to nitrogen ratio of 3:1 to 5:1. In order to enlist the soil bacteria to address nitrogen pollution discharged effluent should have sufficient dissolved carbon for denitrification and microbial metabolism. The typical practice in the treatment of wastewater is to discharge treated effluent with very low carbon concentrations as measured by Biochemical Oxygen Demand ($BOD_5$). Standard practice is evolving to also remove TN to low concentrations in the final effluent. These two factors then limit the potential for natural attenuation in the soils below the soil absorption systems of wastewater treatment systems and wastewater treatment plants. Plumes of nitrogen from treatment plants then tend to travel for miles due to the fact that there is insufficient carbon in situ and in the ground water to promote significant denitrification.

Biochemical Oxygen Demand ($BOD_5$) is a standard test used to determine a measure of the organic strength of wastewater or the amount of organic carbon dissolved in water. $BOD_5$ is the rate at which organisms use the oxygen in water or wastewater while stabilizing decomposable organic matter under aerobic conditions. The $BOD_5$ value is calculated based on the difference between two dissolved oxygen measurements of a sample. The first measurement is taken at the time of collecting the samples and the second measurement is taken after 5 days of incubation. After five days, there is still some remaining dissolved organic carbon that will slowly degrade over time.

With the increase in population and increased development in coastal areas, there have been greater impacts of nitrogen compounds on drinking water and the water quality in estuarine waters. The discharge of treated effluent with excessive levels of nitrate can lead to a public health problem. The EPA has established a Maximum Contaminant Level of ten (10) milligrams per liter of $NO_3^-$ in drinking water. Much lower concentrations of $NO_3^-$ in ground water draining to estuaries can cause degradation of coastal wetlands and coastal waters.

Therefore, there is a need for a method for further reducing nitrogen pollution in treated wastewater and in the ground water affected by the discharge of treated effluent from wastewater treatment facilities into the ground.

There is a need to treat any water with nitrogen pollution and lower the concentration of TN in the water.

SUMMARY OF THE INVENTION

The present invention is directed to a method of mixing organic carbon with the final effluent for wastewater treatment systems or any water having low concentrations of TN and low concentrations of $BOD_5$ and applies the mixture to manmade stratified sand filters, packed bed filters or natural soils to induce proper conditions for high removal of TN in the final effluent.

In one embodiment, the method includes mixing water having a TN concentration less than about 30 mg/l and a $BOD_5$ concentration of less than about 30 mg/l with a sufficient amount of dissolved carbon to cause reduction of the nitrogen pollution in the water, and intermittently percolating the water and dissolved carbon through a fixed bed filter, thereby causing the discharge of insoluble particulate carbon, inherent with the organic carbon, or resulting from causing increased microbial action in the soils, into natural soils and into the ground water, which causes the discharge of long chained carbon, where this particulate carbon and long chained carbon slowly degrades over time and becomes available for denitrification in the ground water. The dissolved carbon can be any organic carbon, but MicroC™ is the preferred carbon source. In some embodiments, the method can further include combining an alkaline agent with the water. The alkaline agent can be at least one member selected from the group consisting of sodium bicarbonate, calcium carbonate, sodium carbonate, calcium hydroxide and sodium hydroxide 50%. The ratio of dissolved carbon-to-nitrogen can be in a range of between about two and a half and ten milligrams per liter of dissolved carbon of Chemical Oxygen Demand (COD) to about one milligram per liter of total nitrogen (TN). Chemical Oxygen Demand (COD) is a measurement of the oxygen equivalent of the organic material in wastewater that can be oxidized chemically by using dichromate in an acid solution, when the organic nitrogen is in a reduced state. The pH of the combined water and dissolved carbon can be in a range of between about six and about nine. In some embodiments, the water can be treated wastewater. In other embodiments, the water can be ground water. The average pore size of the fixed bed filter can be in a range of between about 0.1 mm and about 20 mm. The residence time of the water in the fixed bed filter can be in a range of between about twelve hours and about ten days. The average temperature of the water in the fixed bed can be above about 48 degrees Fahrenheit.

In another embodiment, the method includes mixing ground water or other water having a TN concentration less than about 30 mg/l and a $BOD_5$ concentration of less than about 30 mg/l with a sufficient amount of dissolved carbon to cause reduction of the nitrogen pollution in the treated water, and intermittently percolating the treated water and dissolved carbon through a fixed bed filter or directly into the soils.

This invention causes denitrification in situ downstream in the groundwater by causing the discharge of both readily available carbon and long chained carbon into the soils and into the groundwater to initiate in situ denitrification.

This invention has many advantages, including a reduction in dissolved total nitrogen in treated water of a wastewater treatment system.

The process will result in the removal of total nitrogen from the environment by the intermittent dosing of dilute dissolved organic carbon into filters and soils and into ground water.

The use of this process will reduce the total nitrogen discharged from wastewater treatment facilities and plants by enlisting the soil bacteria in the soils and the soil water below the soil absorption system.

The use of this process will create a circumstance where the plumes of nitrogen from wastewater treatment plants and facilities will be shorter, because the natural attenuation of nitrogen in the soils will be enhanced.

The use of this process will allow the reduction of dissolved nitrogen in the groundwater.

The use of this process as described can be added to any wastewater treatment facility to reduce TN in treated effluent discharged to any water body.

This enhanced denitrification will allow man to more advantageously and cheaply protect the estuarine environment from nitrogen pollution.

This process can be used to remove or lower nitrate pollution from drinking water supplies.

This process can be used to treat groundwater by pumping ground water through a filter and discharging the treated water back to the ground. The ground water can be pumped from either traditional wells or from horizontal wells installed by excavation or by directional drilling.

DETAILED DESCRIPTION OF THE INVENTION

Figure 1A:
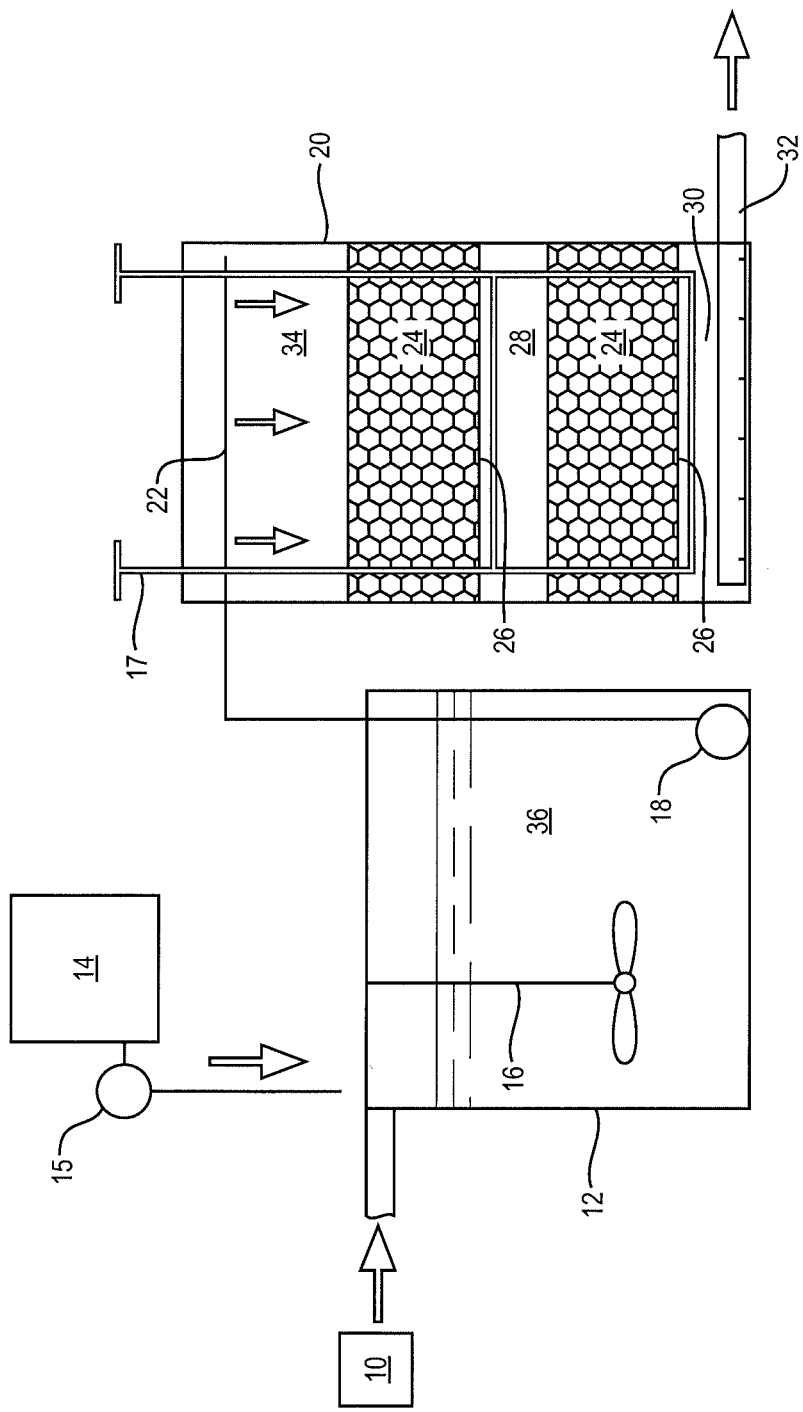
FIG. 1a depicts a cross section in elevation of one embodiment of the device to treat wastewater with low levels of TN and $BOD_5$. This device can be used to treat any water with low levels of TN and $BOD_5$.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

The removal of nitrate from water (denitrification) is a microbially driven reaction in anoxic conditions where an available carbon is present. Denitrification requires nitrate, sufficient time, temperature, bacteria, available carbon and anoxic conditions. If there are sufficient conditions for denitrification, then the dissolved nitrate will be completely denitrified with the end products being free nitrogen gas, free carbon dioxide gas, dissolved organic nitrogen and dissolved organic carbon in the water and organic nitrogen and organic carbon in biomass. This biomass occurs as slime on the media and the walls and bottom of the denitrification tank.

The removal of Total Nitrogen through the device involves not only denitrification but nitrification in that the influent water dosed to the device contains dissolved organic nitrogen, ammonia, nitrate and nitrite. The effluent has about 38% TKN which would include ammonia. The remainder is nitrite and nitrate. The removal has to be based on denitrification or other microbially driven nitrogen removal.

The process mitigates nitrogen plumes from wastewater treatment facilities by inducing in situ denitrification in the soils below the soil absorption system and in the soils in the plume. The process adds suitable mass of organic carbon for treatment. The organic carbon is MicroC™ or an equivalent carbon source, for example organic carbon (i.e., a carbohydrate) with a majority of the carbon molecules being readily available for metabolism and a portion of about ¼ of the carbon molecules being starches and other long chained molecules, added to the process influent and dosing the fluid onto a stratified filter. The process reduces dissolved TN from the applied water. The process induces denitrification downstream in the ground water. The known TN removal of existing RUCK™ filters (RUCK Systems, Storrs, Conn.) illustrates that stratified filters and, by extension, natural soils, remove dissolved TN if the proper carbon to nitrogen ratio is dosed to the filters or to soils. The suitable carbon to nitrogen ratio induces in situ attenuation and denitrification.

The operation of the stratified filter will cause environments in the filter where the water in the sands of the filter is alternatively aerobic and anaerobic. The anaerobic soil water is concentrated at the bottom of the filter. The soil bacteria in the filter will remove most $BOD_5$ and most Total Suspended Solids ("TSS") dissolved in the water. Both are removed due to straining, microbial attack or from interstitial clogging by bacteria. In contrast to what would normally be expected in the discharge of water passing through a filter, very small solid insoluble particles pass through the filter. The solid particles coagulated downstream from the filter after significant changes in flow. A portion of the coagulated particles is insoluble carbon. The particulate carbon has a small diameter that allows it to pass through a filter with a minimum pore size in the filter cloth of 0.21 millimeters and an expected minimum pore size in the sand of 0.1 millimeter. This particulate carbon forms about 22% of the solid insoluble coagulated particulates that pass through the filter. This particulate carbon can be described as a long chained carbon that has passed through the filter. Since the particulate carbon has passed through several zones of varying aerobic and anaerobic conditions, the carbon has resisted bacterial attack. However, the carbon will become available in time for metabolism by the soil bacteria in the soils and in the soil water below the soil absorption system. This particulate carbon is derived from the portion of the Carbon that is starches and other long chained carbons in the organic carbon and any long chained carbon developed by the soil bacteria in metabolism. This particulate carbon is the source of carbon for denitrification downstream in the soil water and the soils from the soil absorption system.

The system that doses the effluent from the filter must be intermittently discharged by any process that will allow the solid particulate carbon to pass into the soil absorption system. The preferred method is to intermittently dose the filter effluent by pumps.

Figure 1B:
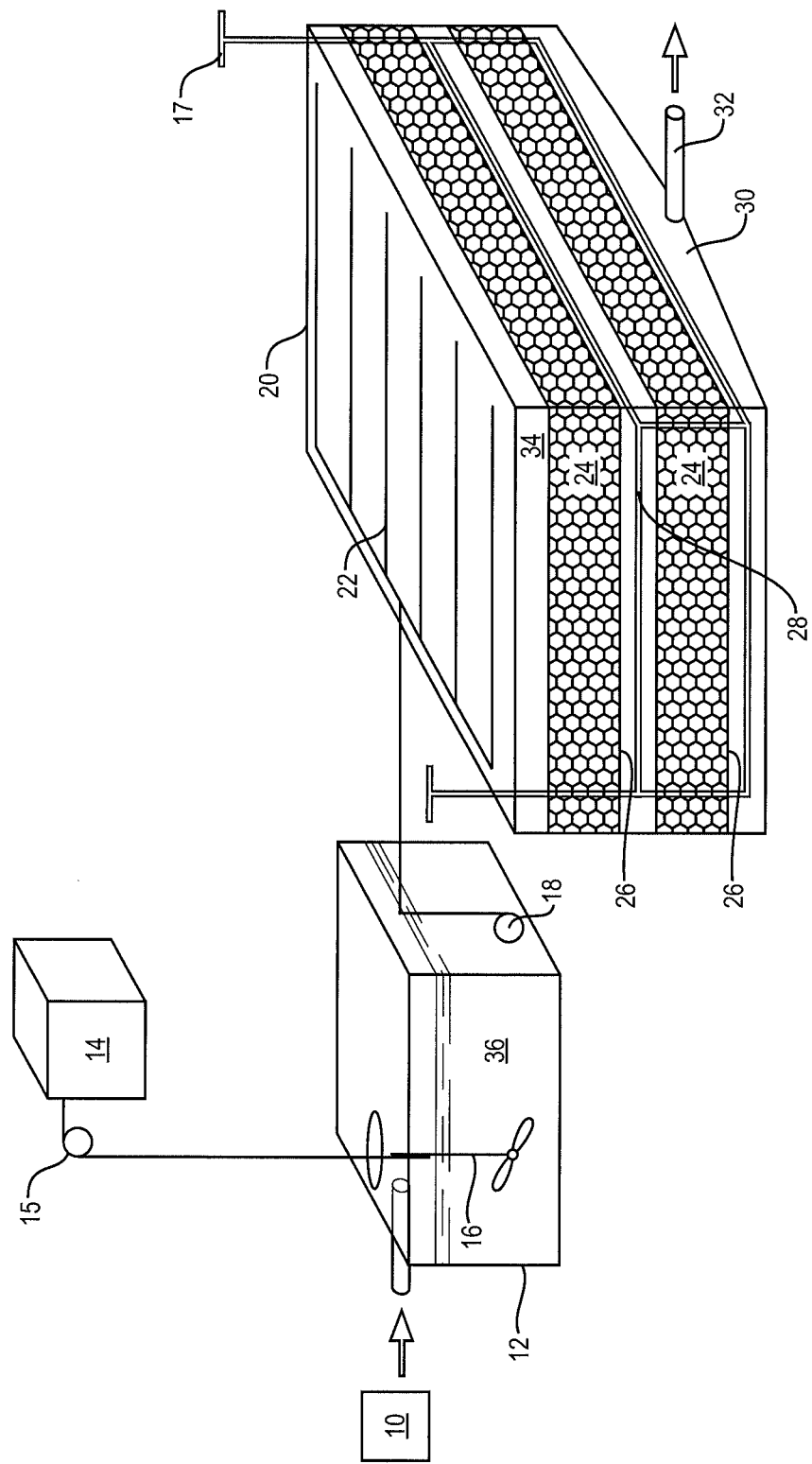
FIG. 1b depicts a plan view of one embodiment of the device to treat wastewater with low levels of TN and $BOD_5$.

FIGS. 1a and 1b depict a typical cross section in elevation and a plan of one embodiment of the device. The purpose of this device is to further reduce dissolved TN in treated waters having a TN concentration less than about 30 mg/l and a $BOD_5$ concentration of less than about 30 mg/l. Influent water 10 in FIG. 1a and FIG. 1b flows into a waterproof container 12. The waterproof container may consist of any durable material resistant to microbial attack. The container should be watertight and waterproof. Watertight containers could be plastic, concrete or fiberglass or treated metal such as stainless steel. Water is added to the tank and the level of the water is controlled by pumps 18. The pumps are controlled by sensors or float switches or by timing. A suitably sized container of dilute organic carbon and, if required, a base chemical 14 is positioned in a fixed place. MicroC™ as manufactured by Environmental Operating Solutions, Inc., (Bourne, Mass.) is a preferred organic carbon. Sodium bicarbonate is the preferred base chemical. A suitably sized pump and pipe system 15 is constructed to drip the dissolved organic carbon and dissolved base chemical into the waters with dissolved nitrogen 36 in the mixing tank 12. The water may be mixed by a mechanical mixer 16. The mixed water is then dosed by a pump 18 on to the top of a packed bed filter (i.e., a fixed bed). The mixed water is distributed on the top of filter 24 using appropriate distribution systems 22 involving perforated pipes or pipes with nozzles. Distribution system 22 doses the water usually onto a media 34 designed to spread the fluid across the top surface. The top surface is designed based on the volume of water to be treated. The media can be crushed stone or specialized plastic media composed of individual pieces spread across the top of the filter. A stratified sand filter is the preferred embodiment. The words "packed bed filter" refer to a filter composed of sands, or stones or alternatively textiles, or specialty plastic media made for water treatment. A network 17 of venting pipes includes a series of perforated pipes laid horizontally between layers of sand or other media, joined to vertical pipes and open to the atmosphere. The network of venting pipes is installed below every filter layer. Nonwoven filter cloth 26 includes a minimum of one layer, but two layers are preferred. With one layer, there is reduced total nitrogen (TN) loss in the device. At the bottom of the filter is a layer 30 of media. There is a collection pipe to collect the treated effluent 32. The bottom of the filter container may be shaped to slope to the collection system. Treated effluent then flows out to be discharged into the environment.

Operation FIGS. 1a and 1b

To properly operate the device, the concentration of TN in the influent waters must be known or measured by commercially available portable test kits or measured at a testing laboratory. The effluent from the wastewater treatment facility is expected to have a TN concentration of less than about 30 mg/l and a $BOD_5$ concentration of less than about 30 mg/l. Then the appropriate mass of dissolved organic carbon and dissolved base chemical is added with an initial ratio of 10 to 1 between the mass of the organic carbon to the mass of the TN. The dose will be adjusted based on the results of the treatment and an analysis of the total nitrogen in the effluent. The long term COD/TN ratio will be calculated with experience on the operation of the device. The long term COD/TN ratio will be lower. The ratio of about 3:1 COD/TN ratio results in loss of half of the dissolved TN in the effluent water leaving the filter.

An appropriate mass of organic carbon and a base chemical, if required, is dissolved in water in the mixing tank 12. The mass of carbon will be very small in proportion to the mass of the water. The carbon should be added and the solution thoroughly mixed. If the influent water flows into the Mixing tank in a steady stream then no mechanical mixer is required as long as the carbon is dropped into the moving stream. A mechanical mixer may be required to continually stir the water if the influent waters are large in volume or if the influent water comes in pulses.

In a volume of water, the dissolved carbon will be so dilute that denitrification will not start in the mixed water since the water will actually tend to be more aerobic. In a packed bed filter, the organic carbon, base chemical and nitrogen will be concentrated at texture changes and nitrification and denitrification will occur. The Total Nitrogen removal will occur at all concentrations of Total Nitrogen.

The effluent is intermittently dosed by a pump 18 to the top of the filter 20 at a rate that is calculated based on the infiltration rate of the sands or the filter media in a packed bed filter. In sands having rapid permeability, the dosing rate could be 16 gallons per square foot per day. The actual dosing rate can be calculated using the actual measured permeability of the sands compacted in place. The application rate can be calculated using the uniformity coefficient and the effective particle size. The design of the filter is based on very little biomat being developed on the top surface. Long term clogging will occur at the bottom of each layer of the filter. In the operation of the filter, the application of the water to the filter should be occasionally observed and if the filter top surface begins to show evidence of ponding or a slow down in the leaching rate through the filter, then the filter should be rested. Within weeks, the clogging areas will be restored by the bacteria, because the water in the sands or media in the filter will tend to become aerobic. Since the lower the rate of loading, the higher the removal rate, the filter surface area may be increased to obtain higher removal rates.

The dosing of the water onto the sand filter or the packed bed reactor typically is periodic, at a rate of approximately eight to twelve times a day, or less. The dosing will cause the water to percolate down to the bottom of the sand layer. In the media below the top and above the bottom, nitrification will occur to convert TKN and ammonia to nitrite and nitrate. At the bottom of the sand layer, water will be temporarily stored in the soil or media pores above the filter cloth and bacterial growth will begin. The bacteria will consume the dissolved oxygen and then denitrification will start. The end products will be free nitrogen gas that will escape through the sands or media, free carbon dioxide gas that will escape through the sands or media, dissolved organic carbon and nitrogen that will be in the biomass in the microbial populations in the media and dissolved organic nitrogen and carbon in the effluent leaving the filter. The removal rate for a filter dosed at these rates will be at least 40%. However, the dissolved carbon and nitrogen in the effluent will be subject to further removal in the environment. The phenomenon at each change in texture will be repeated until the carbon and nitrogen are recalcitrant or not readily used by bacteria. The same process occurs in any layered or stratified media.

Figure 2A:
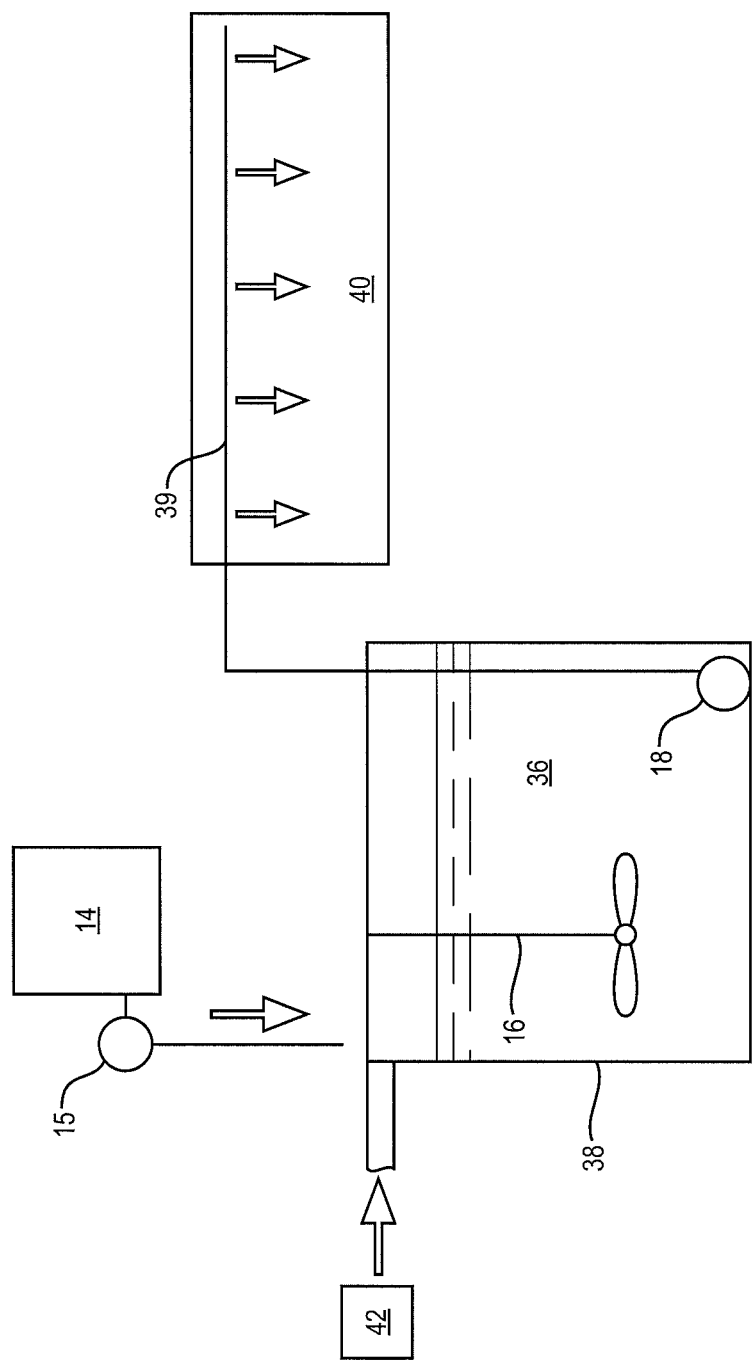
FIG. 2a illustrates adding a device to an existing wastewater treatment facility or plant where the existing dosing structure, 38, has sufficient voids and volume to add the dilute organic carbon to the water being discharged through the existing dosing structures, 38, into the soils, 41, in the ground through soil absorption systems, 40.
Figure 2B:
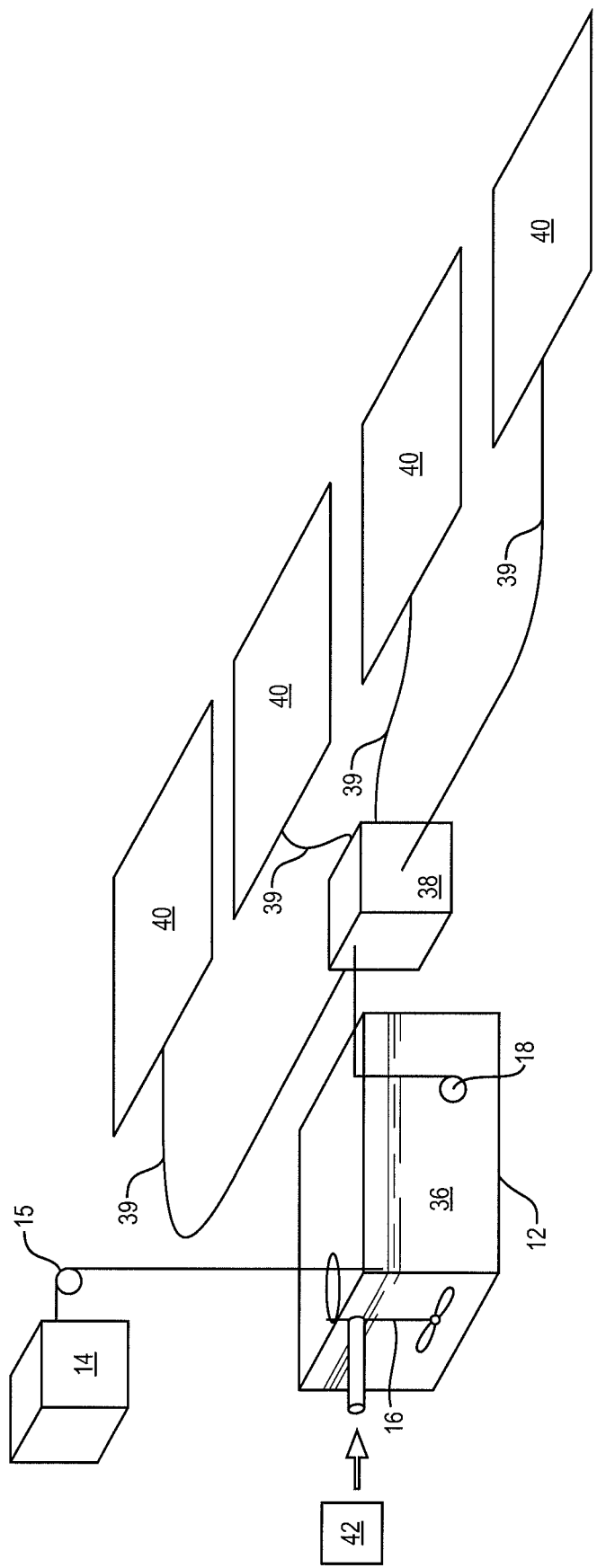
FIG. 2b illustrates adding a new tank, 12, and a new device in line with the flow to the distribution structure at an existing wastewater treatment facility or plant.

FIGS. 2a and 2b depict an alternative embodiment of the device at a wastewater treatment system or facility where organic carbon is added to the final effluent before discharge to the ground. The effluent from the wastewater treatment facility is expected to have a TN concentration of less than about 30 mg/l and a $BOD_5$ concentration of less than about 30 mg/l. The final effluent should have a PH of between 6 and 9 and no base chemical is required to be added. Treatment is induced in the ground below the soil absorption systems. FIGS. 2a and 2b depict a typical cross section in elevation and a plan of one embodiment of the filtration device for practicing the method of the invention. The purpose of this device is to further reduce dissolved nitrogen in the final effluent from wastewater treatment facilities or plants by inducing denitrification in the soils below the soil absorption system. This is done by adding low concentrations of organic carbon 14 to the effluent. Effluent 42 is obtained from a wastewater treatment facility or plant. As shown in FIG. 2a, the device is added to an existing dosing structure 38, which distributes effluent to a series of existing soil absorption systems 40 for the treated effluent. There are a variety of ways for the effluent to be distributed to soil absorption systems. There are a multitude of soil absorption system types. FIG. 2a shows a representative system. In this case, there is sufficient space in the existing dosing structure 38 to add the device. A suitably sized container of dilute organic carbon 14 is positioned in a fixed place. MicroC™ as manufactured by Environmental Operating Solutions, Inc. is a preferred organic carbon. A suitably-sized pump and pipe system 15 is constructed to drip the dissolved organic carbon into the waters with dissolved nitrogen 36 in the existing dosing structure. If there is more than one existing dosing structure, then a device is added to each existing dosing structure. The dosing of the mixed water containing nitrogen, the dissolved organic carbon and dissolved base chemical to the soil absorption system is typically in cycles. The dosing system includes pipes or channels 39. Removal of total nitrogen then occurs in the soils beneath the soil absorption systems caused by the creation of more favorable carbon to nitrogen ratios.

FIG. 2b depicts the situation where the existing dosing structure is too small to fit the device or there is some reason why the device cannot be mounted on the existing dosing structure or structures. In this case, a new mixing structure, 12, is added in the flow line of the treatment facility before reaching existing dosing structure 38. A suitably sized container of dilute organic carbon is positioned in a fixed place. MicroC™ as manufactured by Environmental Operating Solutions, Inc. is a preferred organic carbon. Suitably sized pump and pipe system 18 is constructed to drip the dissolved organic carbon into the waters with dissolved nitrogen 36. The water is mixed by either a mechanical mixer 16, or the water is otherwise stirred. The mixed water is then dosed by whatever mechanism exists, either by gravity or by pumping or by a combination of both. If the treated water is distributed by gravity, then the water from the mixing tank is pumped to the existing dosing structure so that the particulate carbon passes through the mixing tank. The dosing structure should be constructed so that the structure does not trap the insoluble carbon particles and the insoluble carbon particles pass through the dosing structure. The mixed water is distributed on the top of existing soil absorption system 40. The dosing is typically in cycles. Dosing system 39 is in the form of pipes or channels. Removal of total nitrogen then occurs in the soils beneath the soil absorption systems caused by the creation of more favorable carbon to nitrogen ratios.

The existing soil absorption systems must have a surface free of any development of a biomat. The final effluent should have Total Suspended Solid (TSS) concentrations that are below a concentration of 50 mg/l in order that a biomat does not occur on the top of the soil surface in the existing soil absorption systems, because the biomat will remove most of the organic carbon dissolved in the dosed water.

Operation FIGS. 2a and 2b

The discharge of treated effluent from a wastewater treatment facility or plant into the ground can be accomplished by a variety of methods. The dosing can be by gravity or by pumping. There are so many varieties in the method that Applicants will describe a representative method and device that can be added to any discharge system of treated effluent from a wastewater treatment facility or plant into the ground.

FIG. 2a illustrates adding a device to an existing wastewater treatment facility or plant where the existing dosing structure, 38, has sufficient voids and volume to add the dilute organic carbon to the water being discharged through the existing dosing structures 38 into the ground through soil absorption systems 40.

FIG. 2b illustrates adding a tank 12 and a new device in line with the flow to the distribution structure at an existing wastewater treatment facility or plant. In this case, the existing dosing structure 38 has sufficient voids and volume to add the dilute organic carbon to the water being discharged through the existing dosing structures 38 into the ground through soil absorption systems 40. The new device includes a suitably sized container of dilute organic carbon 14, positioned in a fixed place. MicroC™ as manufactured by Environmental Operating Solutions, Inc. is a preferred organic carbon. Suitably sized pump and pipe system 15 is constructed to drip the dissolved organic carbon into the treated wastewater effluent. An appropriately-sized mixer 16, if required, then stirs and mixes the dilute organic carbon and base chemical with the effluent.

To properly operate the device, the concentration of the total nitrogen in the influent waters must be known or measured. Since there is variation in the value of the concentration depending on many variables, an appropriate value must be used of the TN concentration so as to offer sufficient removal. The concentration of the influent TN is measured by testing using either a testing laboratory or using commercially available test kits. Then the appropriate mass of dissolved organic carbon is added with an initial ratio of 10 to 1 between the mass of the organic carbon, measured as COD, to the mass of the total nitrogen. The dose can be adjusted down based on the results of the treatment and an analysis of the total nitrogen in the ground water downstream. The long term COD/TN ratio ought to be around 3:1.

The appropriate mass of organic carbon and a base chemical is dissolved in tank 12. The mass of carbon will be very small in proportion to the mass of the water. The carbon should be added and the solution thoroughly mixed. A mechanical mixer may be required to continually stir the water. If the influent water flows into the mixing tank 12 in a steady stream then no mechanical mixer is required as long as the carbon is dropped into the moving stream. If the treated water is distributed to the soil absorption system by gravity, then the water from the mixing tank is pumped to the existing dosing structure so that the particulate carbon passes through the mixing tank. The dosing structure should be constructed so that the structure does not trap the insoluble carbon particles; the insoluble carbon particles must pass through the dosing structure.

The effluent is dosed to the top of the existing soil absorption systems. The final effluent generally has low concentrations of total suspended solids (TSS). The surface of the soil absorption systems, prior to the device being operated, should have no discernible biomat on the upper surface of the soil absorption system. If the top surface of the soil absorption system has a discernible biomat, then the biomat should be removed by the restoration or replacement of the surface. The process will not work if there is biomat in the upper surface in that the bacteria suspended and attached to the biomat will remove the readily available carbon dissolved in the water. The dissolved carbon and base chemical must reach the natural stratifications in the natural soils beneath the soil absorption systems to attain removal of low concentrations of TN in the effluent.

The dosing of the water onto the soil absorption systems typically is periodic. The dosing will cause the water to percolate down through the natural soils. At each naturally occurring horizon, water will hesitate and be stored in the lower portions of the soil horizons and bacterial growth will begin. The bacteria will consume any dissolved oxygen in the water and then denitrification will start. The end products will be free nitrogen gas that will escape through the soils, free carbon dioxide gas that will escape through the soils, dissolved organic carbon and nitrogen that will be in the biomass in the microbial populations in the soil texture and dissolved organic nitrogen and carbon in the effluent dropping or draining into the next lower soil horizon. The removal rate for soils will be limited to the availability of the dissolved carbon passing through the soils and the textures of the soils. As long as the organic carbon from the biomass and the remainder organic carbon drain into the next layer, there will be denitrification occurring at each texture change. However, the dissolved carbon and nitrogen in the effluent will be subject to further removal in the soils. The phenomenon at each change in texture will be repeated until the carbon and nitrogen are recalcitrant or not readily used by bacteria.

Figure 3A:
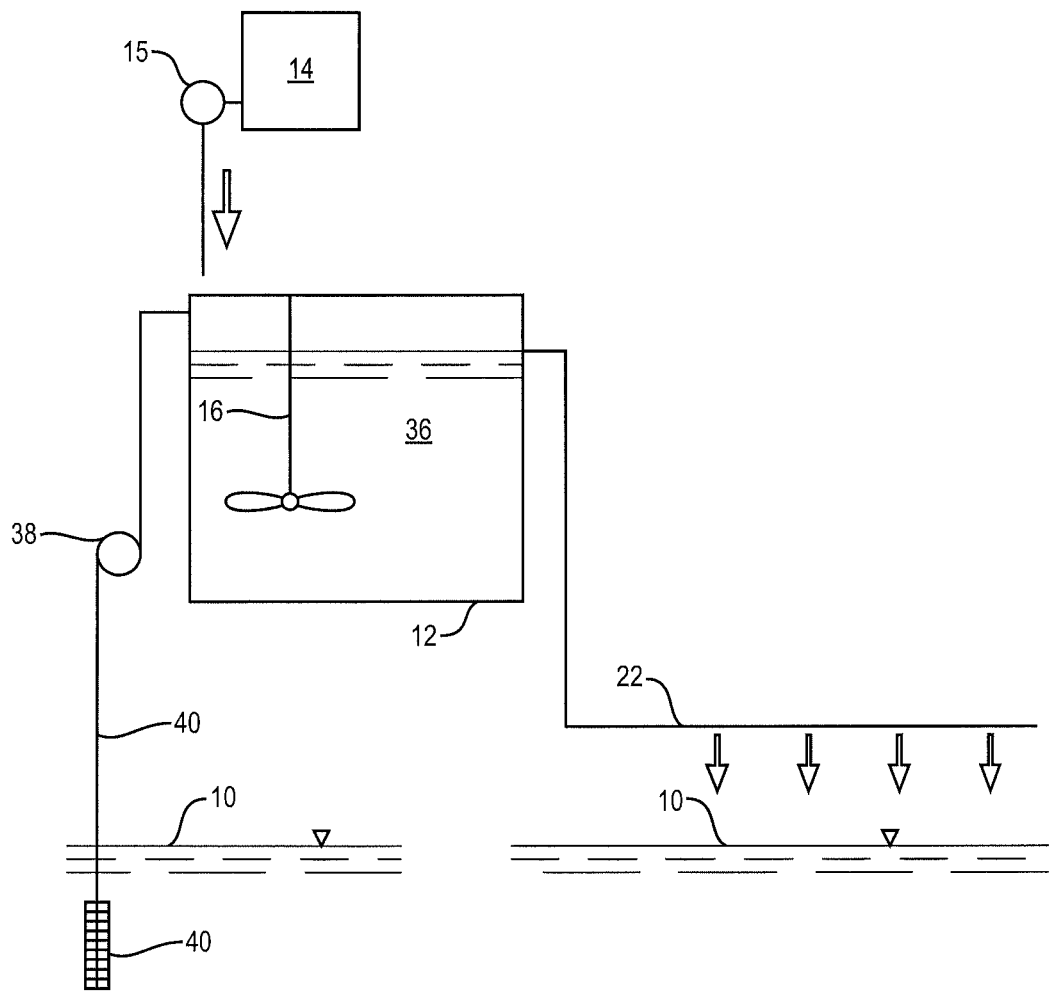
FIG. 3a depicts a typical cross section in elevation of a device to treat ground water.
Figure 3B:
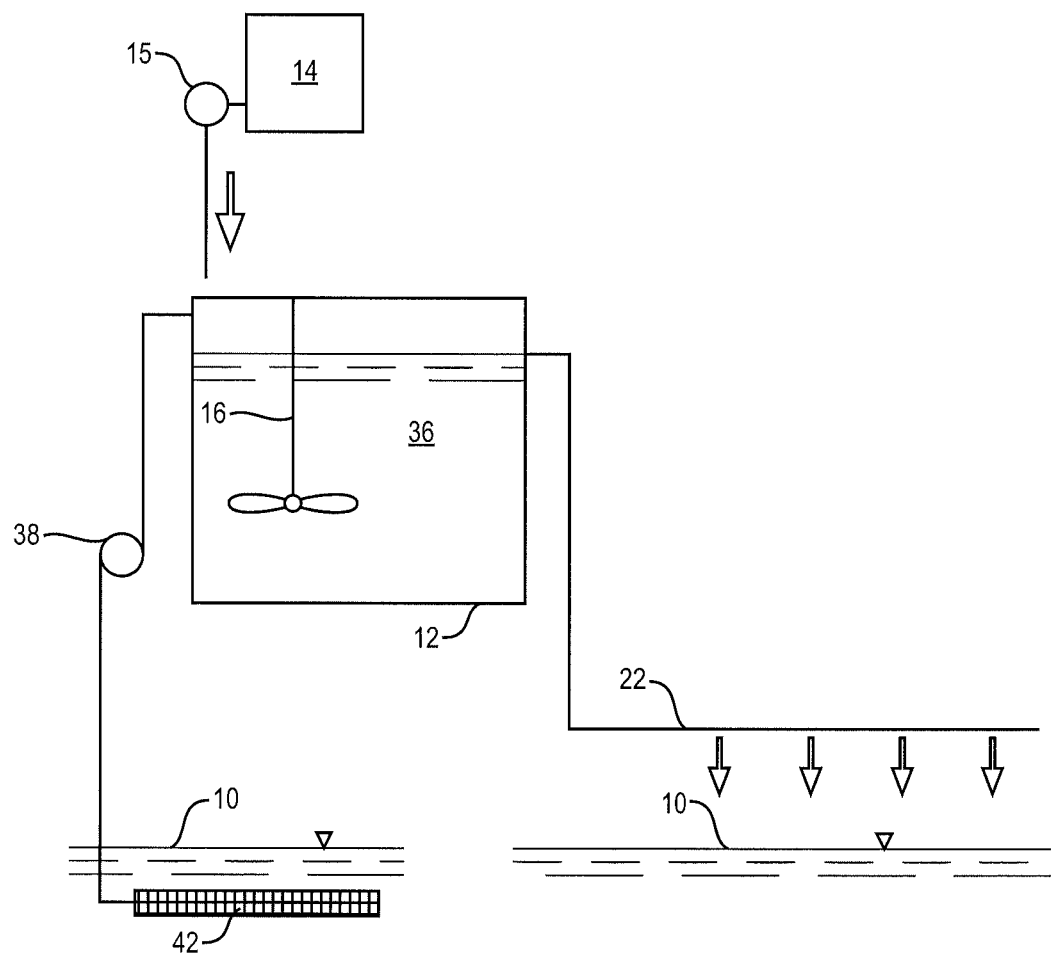
FIG. 3b depicts a typical cross section in elevation of a device to treat ground water.

FIGS. 3a and 3b depict an alternative embodiment of the device to treat groundwater with low levels of nitrate, where groundwater is pumped from recovery wells into a container where organic carbon and a chemical base are added and mixed. FIG. 3a depicts a vertical well to retrieve the ground water. FIG. 3b depicts a horizontal well to retrieve ground water. The mixed fluid is discharged back into the ground above the ground water. FIGS. 3a and 3b depict a typical cross section in elevation of a filtration device for practicing the method of the invention to treat ground water. The purpose of this device is to further reduce dissolved nitrogen in the ground water by pumping and treating the groundwater by adding organic carbon and a chemical base and using the naturally occurring soils above the ground water as treatment sites for nitrification and denitrification. In FIG. 3a, a vertical well 40 is used to retrieve ground water 10 by pump 38. Ground water 10 flows into a waterproof container (i.e., mixing tank) 12. The waterproof container 12 may consist of any durable material resistant to microbial attack. The container should be watertight and waterproof. Watertight containers could be plastic, concrete or fiberglass or treated metal such as stainless steel. The water level in the mixing tank is controlled by sensors or float switches or by timing. A suitably sized container of organic carbon 14 is positioned in a fixed place. MicroC™ as manufactured by Environmental Operating Solutions, Inc. is a preferred organic carbon. Sodium bicarbonate is a preferred base chemical. Suitably sized pump and pipe system 15 is constructed to drip the dissolved organic carbon and chemical base into the mixed water, being the ground water with dissolved nitrogen 38 in the mixing tank 12. The water is typically mixed by a mechanical mixer 16. The mixed water is then dosed by a pump, or by gravity to a series of soil absorption systems 22 installed near the water table. Nitrification and denitrification occur in the vadose zone above the ground water and in the ground water as the ground water flows. The particulate carbon will drop down through the natural soils and will be dispersed throughout the soils and eventually into the soils in the groundwater. This particulate carbon will slowly degrade and provide a carbon source for denitrification in the soils and in the ground water. Introduction of organic carbon enhances the natural denitrification in the soils.

FIG. 3b depicts the well driven by directional drilling or some other method, such as excavation, in a nearly horizontal manner. The horizontal well is driven into the water table to an elevation of a plume of dissolved nitrogen and is installed near the bottom of the plume. If the horizontal well is installed near a discharge region in the water table where the ground water discharges to the environment or to other surface or soil waters, then the depth should be designed based on an appropriate depth to capture the most suitable volume of recharge. In FIG. 3b, the horizontal well 42 is used to retrieve the ground water by a pump 38. The pumped ground water flows into a waterproof container (i.e., mixing tank) 12. The waterproof container may consist of any durable material resistant to microbial attack. The container should be watertight and waterproof. Watertight containers could be plastic, concrete or fiberglass or treated metal such as stainless steel. The water level in mixing tank 12 is controlled by sensors or float switches or by timing. Suitably sized container of dilute organic carbon 14 is positioned in a fixed place. MicroC™ as manufactured by Environmental Operating Solutions, Inc. is a preferred organic carbon. Sodium bicarbonate is a preferred base chemical. Suitably sized pump and pipe system 15 is constructed to drip the dissolved organic carbon and base chemical into the ground waters with dissolved nitrogen 38 in the mixing tank. The water is typically mixed by a mechanical mixer 16. The mixed water is then dosed by a pump, or by gravity to a series of soil absorption systems 22 installed near the water table. The soil absorption system may be a simple slotted pipe driven by horizontal direct drilling. Denitrification occurs in the vadose zone above the ground water and in the ground water as the ground water flows. The particulate carbon will drop down through the natural soils and will be dispersed throughout the soils above the ground water and eventually into the soils in the groundwater. This particulate carbon will slowly degrade and provide a carbon source for denitrification in the soils and in the ground water. Introduction of organic carbon enhances the natural denitrification.

The appropriate mass of organic carbon and base chemical is dissolved in water. The mass of carbon and chemical base will be very small in proportion to the mass of the water. The carbon should be added and the solution thoroughly mixed. An appropriately sized mechanical mixer generally is required to thoroughly mix the carbon and water.

The dosing is typically in cycles. The dosing system is typically installed in duplicate for redundancy. Removal of total nitrogen then occurs in the soils beneath the soil absorption systems and in the ground water, caused by the creation of more favorable carbon to nitrogen ratios.

Operation FIGS. 3a and 3b

Nitrate pollution in ground water can come from a variety of sources. The removal technique of the nitrate pollution should be based on the understanding of the cause of the nitrate pollution. If nitrate pollution is from agricultural and fertilizer applications, then the nitrate pollution will be dispersed in the ground water throughout a broad area of the water table. There may not be a specific plume. If there is a plume, the plume will be wide and the depth may be significant depending on the location of the application of the nitrogen fertilizers. The nitrate pollution will most likely be dispersed throughout the width of the water table. The depth of the nitrate plume will vary with the travel time from the application site.

In contrast, the nitrate pollution from on-site septic systems tends to be tubular and snakelike in shape. The nitrate pollution is usually confined to a discrete nearly horizontal but sloped tube that represents the result of diffusion and some dilution. The volume recharged from most small-scale septic systems does not alter the direction and flow of the water table. The plume may be visualized as a long tube in the groundwater. The tube-like plume will drop in the groundwater as recharge from rainfall and other sources drains into and on top of the plume as it travels downstream in the ground water. The plumes from wastewater treatment plants are usually much larger in width and depth due to the volume of the water discharged. The plumes from wastewater treatment plants can expand much more than the plumes from on site systems due to the volume of discharge being very significant in contrast to the ground water. Sewage plumes from treatment plants can approach widths of a mile and travel miles of distance from the discharge point in some sands and gravels.

The device here can be used to treat nitrate pollution of ground water. The technique of using a vertical well will be used to capture a portion of a broad plume. The horizontal well driven by directional drilling or by direct excavation may be used to intercept a portion of a broad plume. The horizontal well driven by directional drilling or by direct excavation will be used to intercept narrow plumes. In some plumes from on site septic systems, the location of the snakelike or tube-like plume will not be known so a horizontal well could be used to intercept the plume.

FIG. 3a illustrates adding a device to treat ground water by recovering the ground water by a vertical well 40. A pump moves the ground water into a mixing tank 12. Dilute organic carbon and a base chemical are added by a controller 15. Mixer 16 mixes the dilute organic carbon and the ground water. The water is then dosed by a soil absorption system 22 into the ground, near and above the ground water 10.

FIG. 3b illustrates adding a device to treat ground water by recovering the ground water by a horizontal well 42. The horizontal well is installed by direct excavation or by directional drilling. The well screen should be located down at least three feet below the lowest expected elevation of the ground water. A pump moves the ground water into a mixing tank 12. Dilute organic carbon and a base chemical are added by a controller 15. Mechanical mixer 16 stirs the dilute organic carbon and the ground water. The water is then dosed into the ground near and above the ground water.

To properly operate the device, the concentration of the total nitrogen in the ground water must be known, measured or estimated. The concentration of the TN in the ground water is measured by acquiring a sample of the water and testing the water using either a testing laboratory or using a commercially available test kit. Then the appropriate mass of dissolved organic carbon is added with an initial ratio of 10 to 1 between the mass of the organic carbon, measured as COD, to the mass of TN. The dose can be adjusted down based on the results of testing of the ground water. The proper location of the wells is always downstream of the soil absorption system. The removal rate can be estimated over time by maintaining a log of TN concentrations in the water pumped from the well. The TN concentrations will drop over time. The ground water velocity and direction should be known to install the well and soil absorption system appropriately. The direction of the soil absorption system should always be ninety degrees to the direction of the ground water.

The mixed water is dosed to the top of the soil absorption system. The mixed water should have low concentrations of total suspended solids. The dosing of the mixed water onto the soil absorption systems typically is periodic. The dosing will cause the water to percolate down through the natural soils. The soil absorption systems should be installed in duplicate arrangements of more than two. The dosing of the soil absorption systems should alternate. If a soil absorption system becomes clogged, it should be rested. Then other soil absorption systems should be used until the clogged soil absorption system is cleared by bacterial action. If the soil absorption system becomes permanently clogged new soil absorption systems will need to be installed.

At each naturally occurring soil horizon, below the soil absorption system in the vadose zone, water will hesitate and be stored in the lower portions of the soil horizons and bacterial growth will begin. In using the carbon, the bacteria will consume any dissolved oxygen in the water and then denitrification will start using the remaining carbon. The end products will be free nitrogen gas that will escape through the soils, free carbon dioxide gas that will escape through the soils, dissolved organic carbon and nitrogen that will be in the biomass in the microbial populations in the soil texture and dissolved organic nitrogen and carbon in the effluent dropping or draining into the next lower soil horizon. The removal rate for soils will be limited to the availability of the dissolved carbon and the ongoing source of carbon from the long term degradation of the particulate carbon and the textures of the soils. As long as a portion of the organic carbon from the mixed water or any dissolved organic carbon from the biomass in the soils drains into the next layer, there will be denitrification occurring at each texture change. The same process will occur in the ground water, as the soil pores in the ground water will also offer sites where the water will hesitate in movement.

Particulate carbon from the process will drop down through the natural soils and will be dispersed throughout the soils and eventually into the soils in the groundwater. The particulate carbon is primarily from the applied organic carbon. Other particulate carbon may be also be created as a result of increased rate of bacterial metabolism. This particulate carbon will slowly degrade and provide a carbon source for denitrification in the soils and in the ground water.

Figure 4:
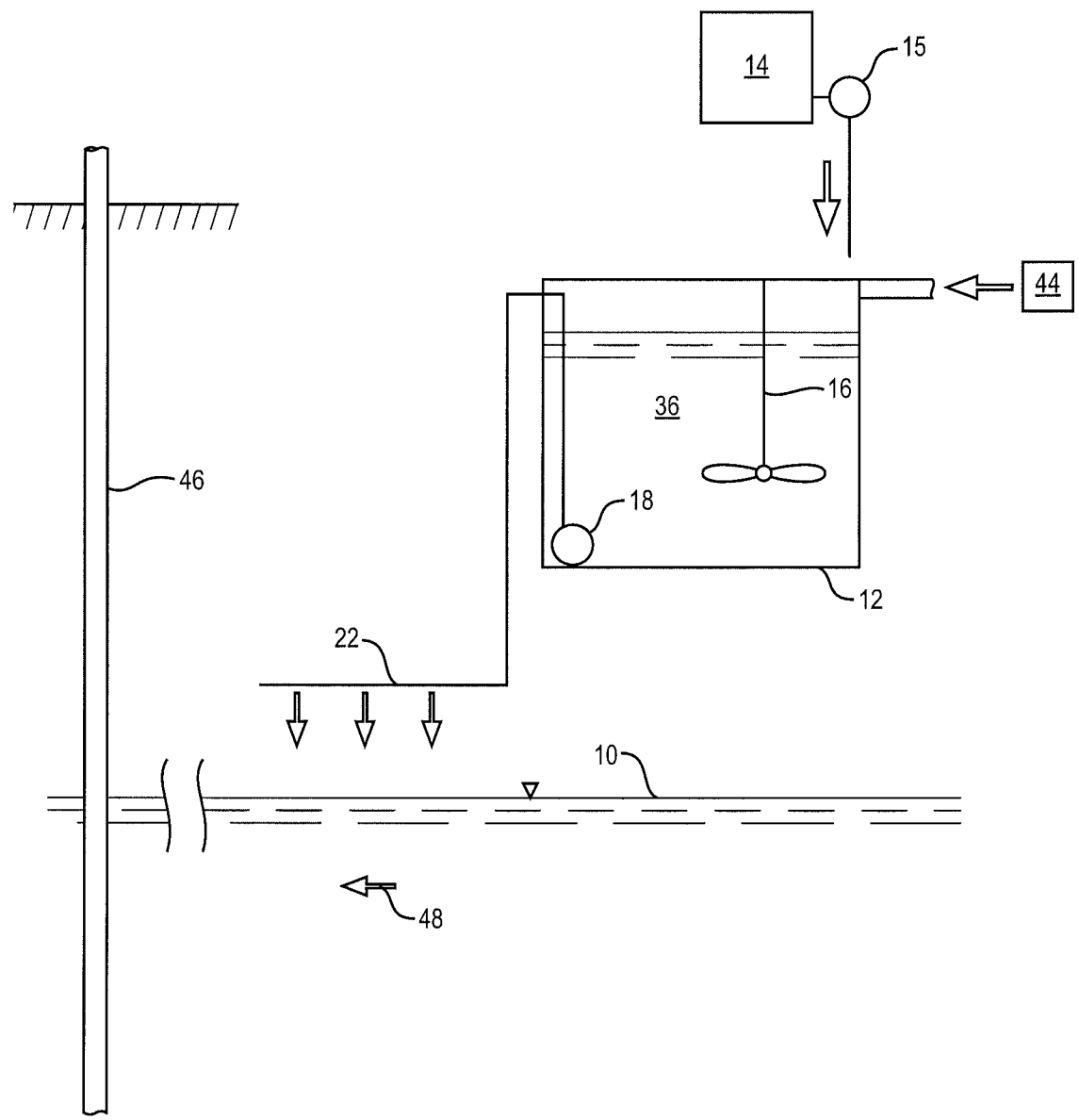
FIG. 4 depicts an alternative embodiment of the device to treat groundwater with low levels of TN, where water with dissolved organic carbon and dissolved base chemical is added to a soil absorption system in vicinity of the water table, where the mixed water with dissolved organic carbon and a dissolved chemical base is discharged into the ground.

FIG. 4 depicts an alternative embodiment of the device to treat ground water with low levels of nitrate, where water with dissolved organic carbon and dissolved base chemical is added to a soil absorption system in vicinity of the water table, where the mixed water with dissolved organic carbon and a dissolved chemical base is discharged into the ground. FIG. 4 depicts the device where any clean water is used to dilute the organic carbon and chemical base and the mixed water is dosed intermittently to a soil absorption system above the water table. As shown in FIG. 4, water 44 flows into a waterproof container (i.e., mixing tank) 12. The waterproof container may consist of any durable material resistant to microbial attack. The container should be watertight and waterproof Watertight containers could be plastic, concrete or fiberglass or treated metal such as stainless steel. The water is typically mixed by a mechanical mixer 16. The water level in the mixing tank is controlled by sensors or float switches or by timing. Suitably sized container of dilute organic carbon and base chemical 14 is positioned in a fixed place. MicroC™ as manufactured by Environmental Operating Solutions, Inc. is a preferred organic carbon. Sodium bicarbonate is a preferred base chemical. Suitably sized pump and pipe system 18 is constructed to dose the dissolved organic carbon and base chemical into a series of soil absorption systems 22 set above groundwater containing dissolved nitrogen 10. The soil absorption systems 22 should be set at a ninety-degree angle to the direction of the ground water flow. The soil absorption system 22 can be installed by directional drilling. The length of the soil absorption system 22 is the limiting factor in the lateral extent of nitrogen removal. Denitrification occurs in the ground water as the ground water flows. The introduction of organic carbon enhances the natural denitrification. In this application, the concentration of the chemical base can be very low or eliminated, if the TN consists solely of nitrate with little or no ammonia or TKN.

The dosing typically is in cycles. The dosing system should be installed in duplicate. Removal of total nitrogen then occurs in the soils in the ground water, caused by the creation of more favorable carbon to nitrogen ratios.

Operation FIG. 4

The device here can be used to treat nitrate pollution of ground water. To properly operate the device, the concentration of the total nitrogen in the ground water must be known, measured or estimated. Then the appropriate mass of dissolved organic carbon is added with an initial ratio of 10 to 1 between the mass of the organic carbon, measured as COD, to the mass of TN. The dose may be adjusted based on the results of testing of the ground water. The required dose of the base chemical has to be determined based on the measured pH of the ground water by testing using commercially available test kits or by calculation using the presence of ammonia or TKN in the water table. This device and method will have limited success if the ammonia and TKN concentrations dominate the TN concentrations of the ground water. The removal of TN is based on denitrification, which is the removal of nitrate. The device and method in this embodiment will have limited success since nitrification is limited in ground water so the microbial process to convert ammonia will be the limiting factor in ground water.

The removal rate can be estimated over time by maintaining a log of TN concentrations in the groundwater. The TN concentrations will drop over time. The ground water velocity and direction should be known to properly locate a monitoring well downstream. The direction of the soil absorption system should always be ninety degrees to the direction of the ground water.

The mixed water is dosed to the top of the soil absorption system. The mixed water should have low concentrations of TSS. The dosing of the mixed water onto the soil absorption systems typically is periodic. The dosing will cause the water to percolate down through the natural soils. The soil absorption systems should be installed in duplicate arrangements of more than two. The dosing of the soil absorption systems should alternate. If a soil absorption system becomes clogged, it should be rested. Then other soil absorption systems should be used until the clogged soil absorption system is cleared by bacterial action. If the soil absorption system becomes permanently clogged, new soil absorption systems will need to be installed.

The soil absorption system should be installed in soils classified as Excessively Drained soils, Somewhat Excessively Drained soils, Well Drained soils and Moderately Well Drained soils above the water table. The purpose of this device is to add the mixed water in close proximity to the water table and have the carbon in the mixed water reach the water table and induce the removal of TN in the ground water. The limiting factor will be the how much of the groundwater volume can be treated. As the mixed water reaches the water table, the mixed water will tend to gradually drop in the groundwater since the mixed water is slightly heavier than the ground water.

Particulate carbon from the process will drop down through the natural soils and will be dispersed throughout the soils and eventually into the soils in the ground water. The particulate carbon is primarily from the applied organic carbon. Other carbon and other particulate carbon may be also be created as a result of the increased rate of bacterial metabolism. This particulate carbon will slowly degrade and provide a carbon source for denitrification in the soils and in the groundwater.

In the saturated soils, as the ground water moves through the soils, there will be discontinuities and changing pore size, which will cause hesitation of the water movement. When the water hesitates and is stored in the saturated soil pores, bacterial growth will increase. The bacteria will consume any dissolved oxygen in the water and then denitrification will start. The end products will be free nitrogen gas that will escape through the soils, free carbon dioxide gas that will escape through the soils, dissolved organic carbon and nitrogen that will be in the biomass in the microbial populations in the soil texture and dissolved organic nitrogen and carbon in the ground water. The removal rate for TN in ground water will be limited to the portion of the ground water exposed to the dissolved organic carbon. A portion of the carbon will take some time to degrade so the denitrification may proceed slowly downstream in the water table as the ground water moves.

Figure 5:
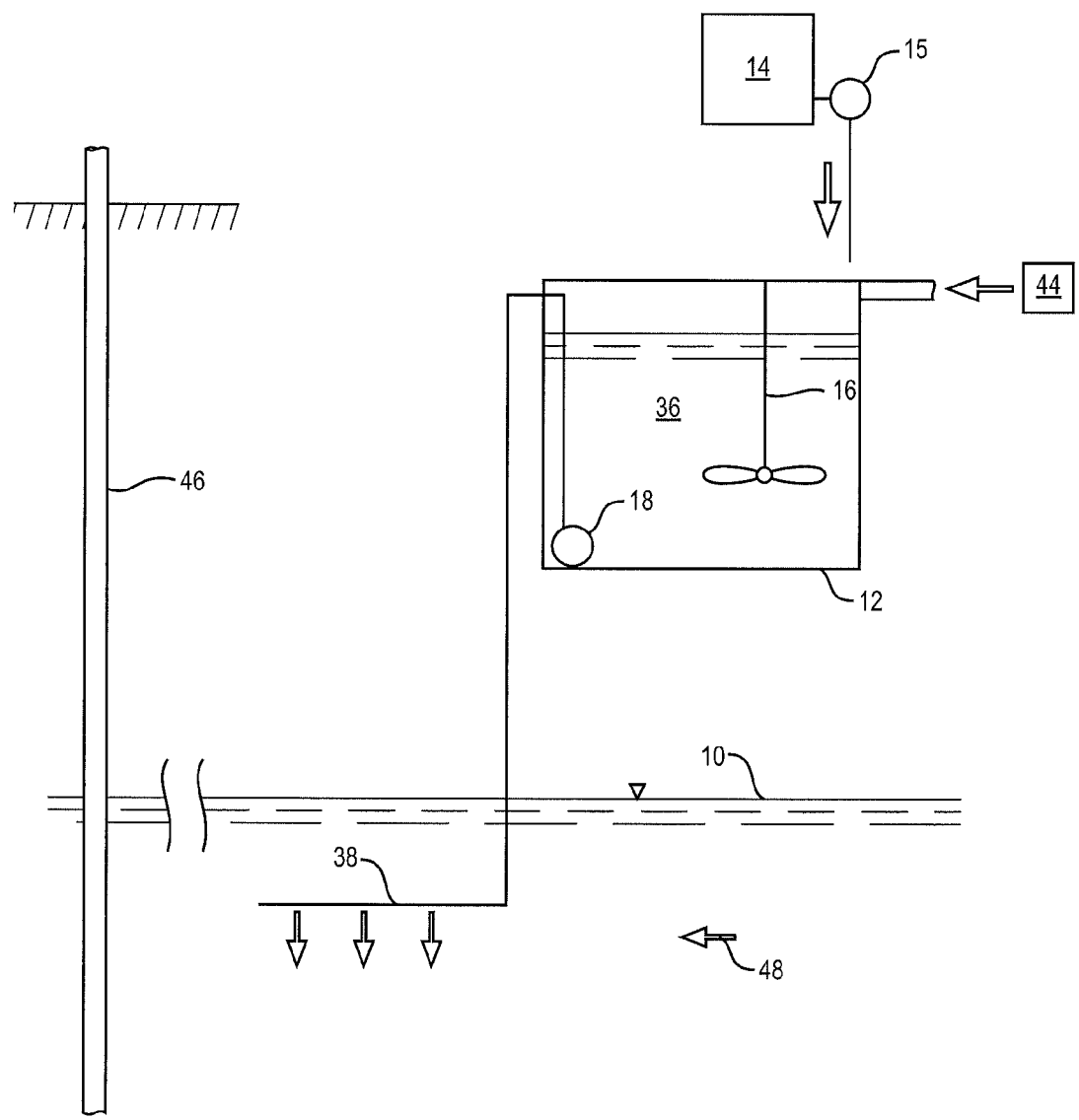
FIG. 5 depicts an alternative embodiment of the device to treat groundwater with low levels of TN, where dilute organic carbon is added to a soil absorption system in the water table.

FIG. 5 depicts an alternative embodiment of the device to treat groundwater with low levels of nitrate, where dilute organic carbon is added to a soil absorption system in the water table. FIG. 5 depicts the device where any clean water is used to dilute the organic carbon and chemical base and the mixed water is dosed intermittently to a soil absorption system in the water table. As shown in FIG. 5, water 44 flows into a waterproof container (i.e., mixing tank) 12. The waterproof container may consist of any durable material resistant to microbial attack. The container should be watertight and waterproof. Watertight containers could be plastic, concrete or fiberglass or treated metal such as stainless steel. The water is mixed by a mechanical mixer 16. The water level in the mixing tank is controlled by sensors or float switches or by timing. Suitably sized container of dilute organic carbon and base chemical 14 is positioned in a fixed place. MicroC™ as manufactured by Environmental Operating Solutions, Inc. is a preferred organic carbon. Sodium bicarbonate is a preferred base chemical. Suitably sized pump and pipe system 18 is constructed to dose the dissolved organic carbon and base chemical into soil absorption system 38 set above the groundwater, which groundwater contains dissolved nitrogen 10. Soil absorption system 38 should be set at a ninety-degree angle to the direction of the ground water flow. The soil absorption system can be installed by directional drilling. The length of the soil absorption system is the limiting factor in the extent laterally of nitrogen removal. Denitrification occurs in the ground water as the ground water flows. The introduction of organic carbon enhances the natural denitrification. In this application, the concentration of the chemical base can be very low or eliminated, if the TN consists solely of nitrate with little or no ammonia or TKN.

The dosing typically is in cycles. The dosing system should be installed in duplicate. The removal of TN then occurs in the soils in the ground water, caused by the creation of more favorable carbon to nitrogen ratios.

In this case, the particulate carbon in the organic carbon or any particulate carbon created from the soil bacteria's increased rate of metabolism will be dosed into the water table. The particulate carbon will be trapped in some soil void interstices and will drop down through the natural soils and will be dispersed into the ground water. This particulate carbon will slowly degrade and provide a carbon source for denitrification in the soils and in the ground water.

Operation FIG. 5

The diluted organic carbon in the dosing system may induce bacterial growth in the system. The system should be tested occasionally by pumping the soil absorption system as if it was a well. If the soil absorption system becomes clogged then it will take more energy to pump the system like a well.

When the system is originally installed, the system should be pumped like a well and the pressure recorded to estimate how much energy the well pump has to exert to draw the ground water to the surface. Occasionally, after operation, the same pump test should be performed and the pressure readings compared. If there is a significant difference, not related to changes in elevation of the water table, then the bacteria may be growing in the soil absorption system causing clogging in the pipes. A new soil absorption system may then be required. Alternately, the system could be rested for several months and retested. If the bacterial growth is in the area above the ground water, then aerobic conditions should be allowed to occur in the soil absorption system and the aerobic bacteria will consume the biomass.

EXEMPLIFICATION

The process and device were tested at a wastewater treatment system. The wastewater treatment system is designed to remove TN and have final effluent having a final TN concentration of less than 10 milligrams per liter. The influent water dosed to the device had already undergone treatment where TN was removed in other parts of the wastewater treatment system upstream of the device. The water passed through a stratified RUCK™ filter where the organic nitrogen and ammonia were converted to nitrate and nitrite. The effluent from the filters flowed into a mixing chamber where denitrification occurred.

In a one year period from September 1 of Year Three through August 31 of Year Three, there were only certain grab samples taken of the denitrified fluid applied to the device. These samples are not required as a condition of a permit to operate the wastewater treatment facility, so there are only limited samples. The testing of these samples revealed the concentrations of TN shown in Table 1:

TABLE 1

| Total Nitrogen (the sum of TKN + Nitrite + Nitrate) in mg/l ||
| --- | --- |
| High | 12 |
| Low | 5.7 |
| Average | 8.4 |
| Mean | 8.4 |
| Count of tests | 13 |

The fluid leaving the mixing tanks had almost all dissolved organic nitrogen. The fluid leaving the mixing tanks was then periodically dosed to the device, which was labeled a polishing filter. In the influent of the polishing filter, the concentrations of both $NO_2^-$ and $NO_3^-$ were almost always below detection level (BDL). These values were the results of tests of grab samples of the water tested at a testing laboratory. MicroC™ was added to the water entering the pump station that dosed the polishing fluid. The carbon was dosed periodically. The carbon dropped into the water entering the pump station and was thoroughly mixed with the water in the pump station. The fluid then passed through the polishing filter. After the polishing filter, the effluent flowed through an ultraviolet light and flowed to a final effluent pump station where the water was periodically pumped to a series of trenches for disposal into the ground. In a twenty month period from September 1 of Year Three through April 30 of Year Five, as a result of composite samples taken weekly at the final effluent pump station that doses the soil absorption system, the final effluent had the concentrations of critical constituents shown in Tables 2-4.

TABLE 2

Biological Oxygen Demand (BOD$_5$) measured in mg/l

| | |
|---|---|
| High | 33.3 |
| Low | BDL |
| Average | 5.8 with BDL = 3 |
| Mean | 3.4 with BDL = 3 |
| Count of tests | 85 |
| Number of tests with BDL | 38 |

TABLE 3

Total Suspended Solids (TSS) measured in mg/l

| | |
|---|---|
| High | 40 |
| Low | BDL |
| Average | 7.3 with BDL = 1.5 |
| Mean | 4.0 with BDL = 1.5 |
| Count of tests | 85 |
| Number of tests with BDL | 28 |

TABLE 4

Total Nitrogen (Sum of TKN + Nitrite + Nitrate) in mg/l

| | |
|---|---|
| High | 14.8 |
| Low | 2.1 |
| Average | 5.5 |
| Mean | 5.1 |
| Count of tests | 85 |

Figure 6:
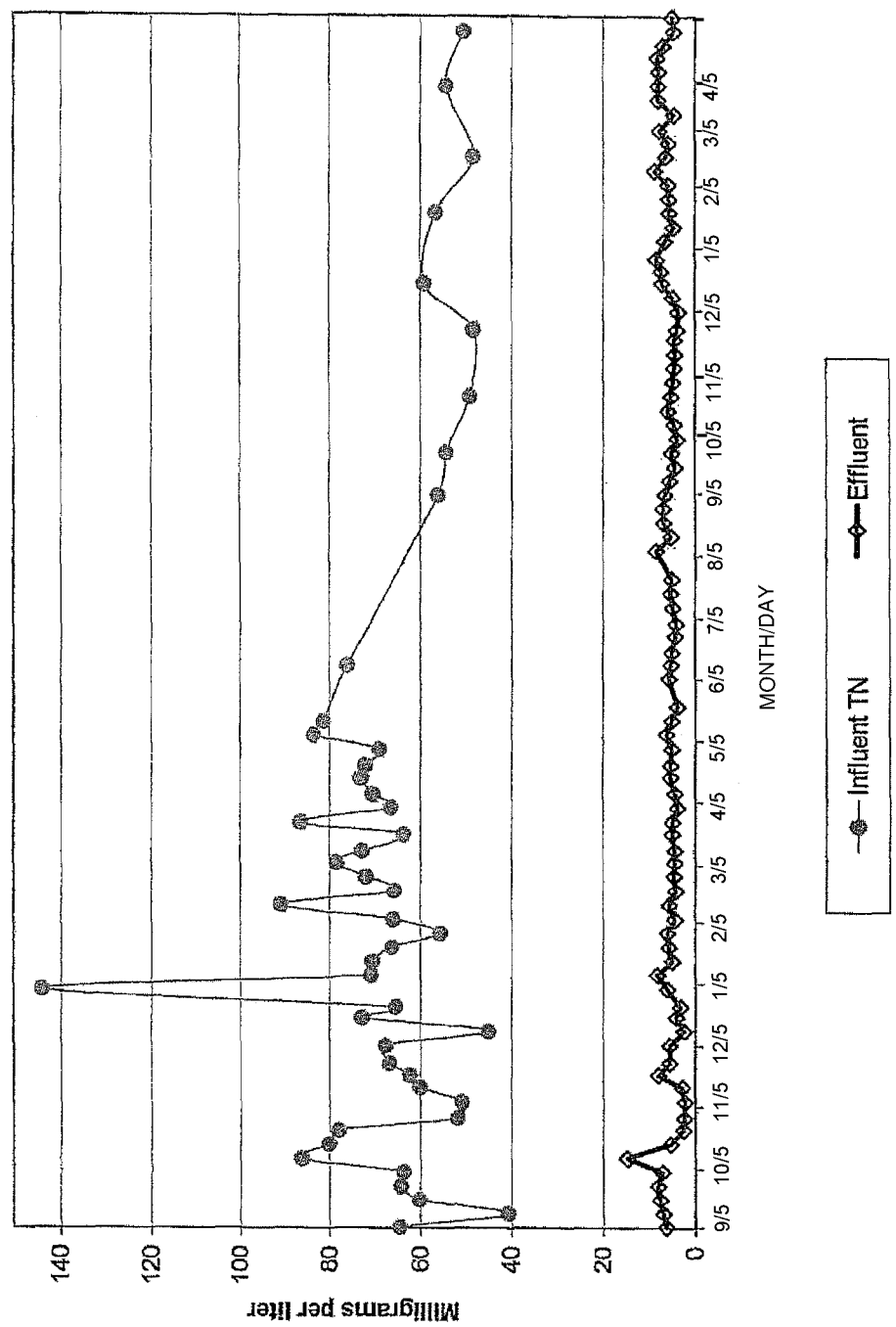
FIG. 6 is a graph that shows the removal rates for $BOD_5$ for the entire system.
Figure 7:
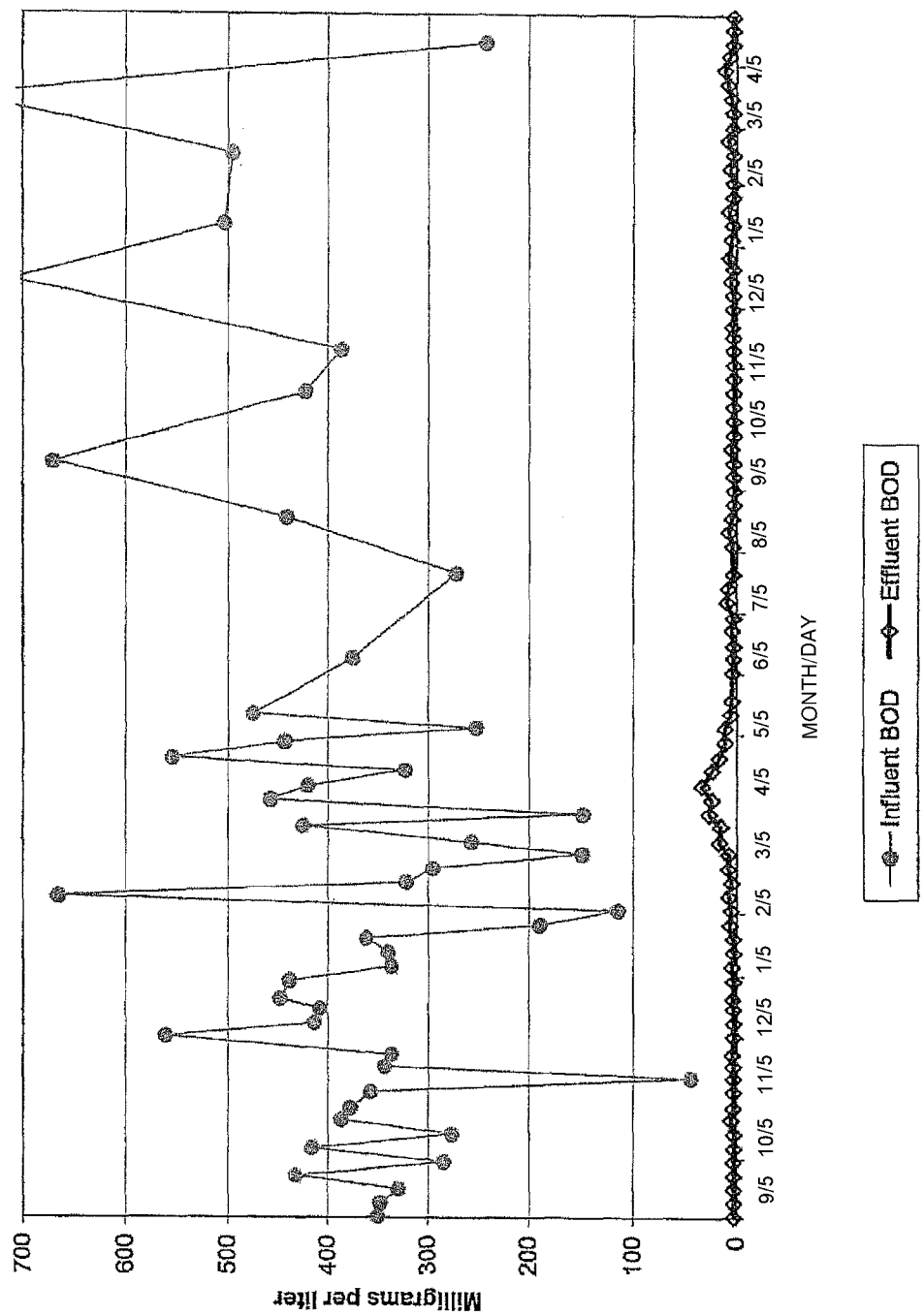
FIG. 7 is a graph that shows the removal rates for TSS for the entire system.
Figure 8:
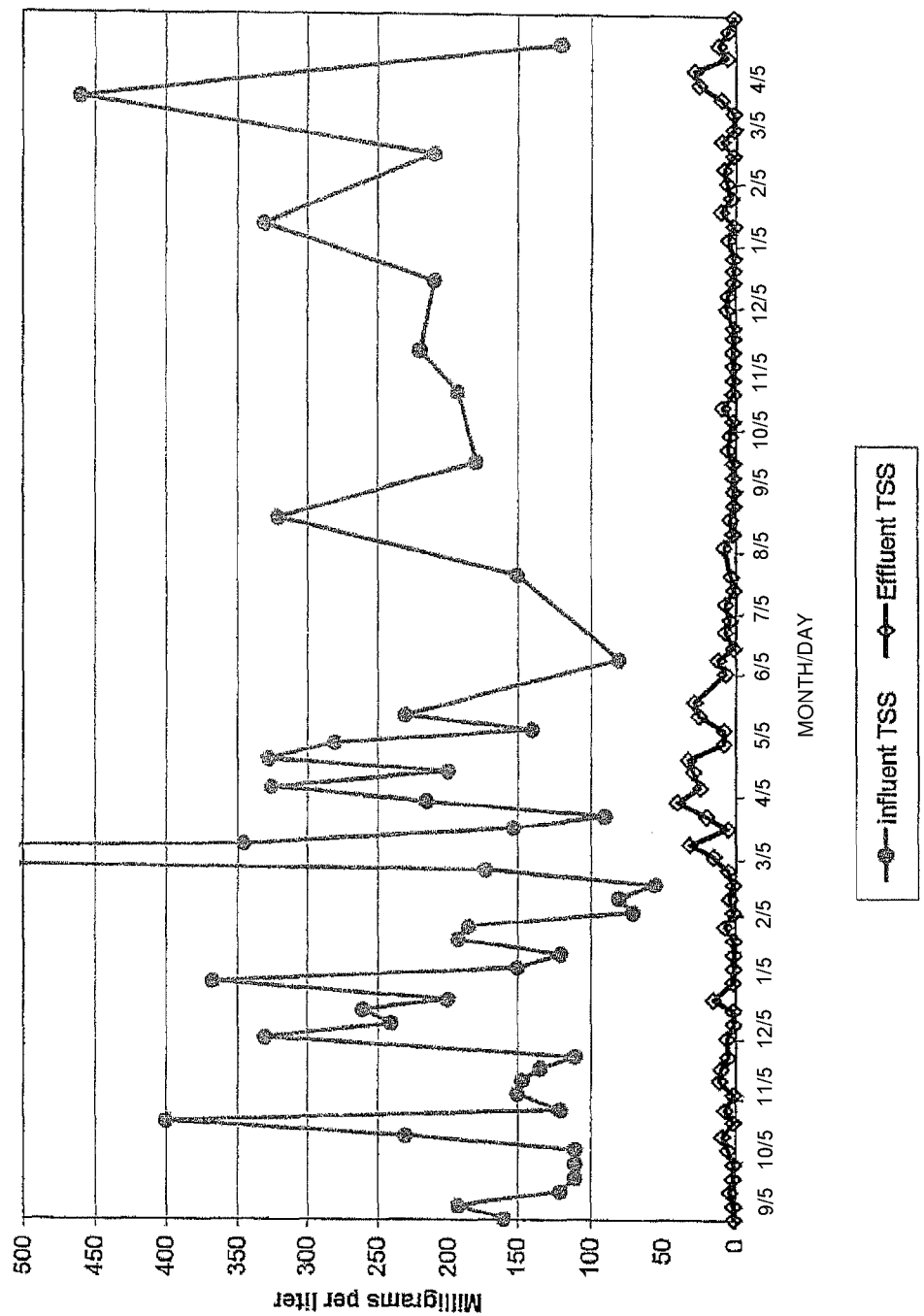
FIG. 8 is a graph that shows the removal rates for TN for the entire system.

FIGS. 6, 7 and 8 are graphs that show the removal rates for BOD$_5$, TSS and TN for the entire system.

Results of the Operation of the Polishing Filter when Dosed with MicroC™

In a twelve month period between September 1 of Year Three and August 31 of Year Four, the polishing filter removed almost 42% of the TN in the polishing filter influent as measured by the change in concentrations values.

In an effort to understand how much carbon is needed, the dose of the MicroC™ was altered to the polishing filter influent pumping station by adjusting the timer controlling the carbon pump. According to the manufacturer, MicroC™ has a Chemical Oxygen Demand of 628,333 mg/l. Chemical Oxygen Demand (COD) is a measurement of the oxygen equivalent of the organic material in wastewater that can be oxidized chemically by using dichromate in an acid solution, when the organic nitrogen is in a reduced state.

From April of Year Four to August 24 of Year Four, Applicants dosed an estimated 2400 ml of MicroC™ each day into the influent polishing filter pump station, resulting in the polishing filter performance shown in Table 5.

TABLE 5

Performance of the Polishing Filter between April and August of Year Four

| | |
|---|---|
| Average Removal of TN | 39% |
| Mean Removal of TN | 38% |
| Average COD/TN ratio | 11.7 |
| Mean COD/TN ratio | 12.2 |

From August 24 of Year Four to October 23 of Year Four, an estimated 1000 ml of MicroC™ was dosed each day into the influent polishing filter pump station, resulting in the polishing filter performance shown in Table 6.

TABLE 6

Performance of the Polishing Filter between August and October of Year Four

| | |
|---|---|
| Average Removal of TN | 46% |
| Mean Removal of TN | 46% |
| Average COD/TN ratio | 4.5 |
| Mean COD/TN ratio | 4.5 |

From October 23 of Year Four to June 9 of Year Five, an estimated 840 ml of MicroC™ was dosed each day into the influent polishing filter pump station, resulting in the polishing filter performance shown in Table 7.

TABLE 7

Polishing Filter Performance between October (Yr. Four) and June (Yr. Five)

| | |
|---|---|
| Average Removal of TN | 51% |
| Mean Removal of TN | 47% |
| Average COD/TN ratio | 3.8 |
| Mean COD/TN ratio | 3.6 |

Figure 9:
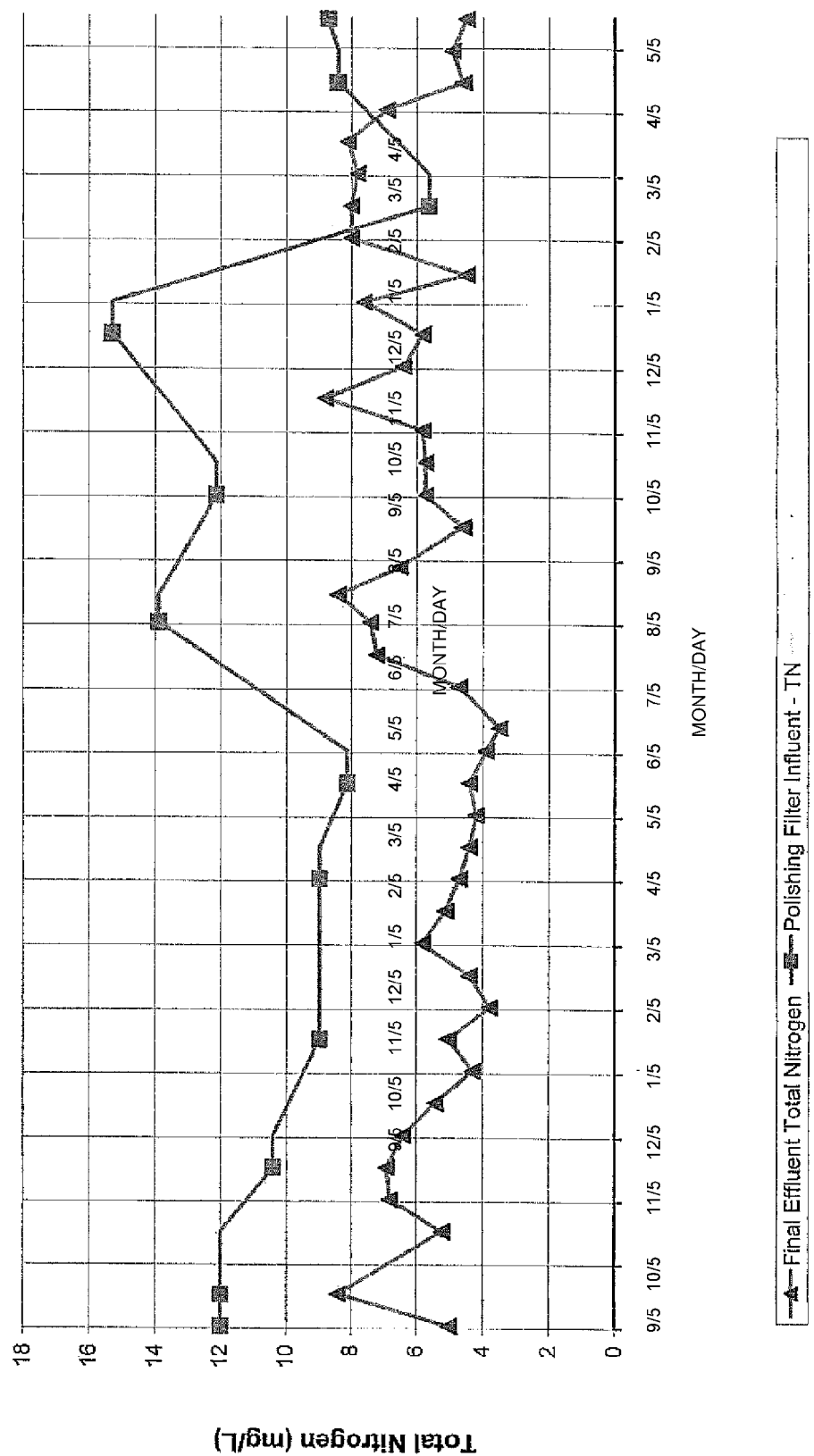
FIG. 9 is a graph that shows the removal rate of TN through the polishing filter.

It appears that, for a mature polishing filter, the appropriate COD/TN ratio is at or below 3.8. The filters do store carbon in that there will be some storage in the anoxic zones. In anaerobic conditions, any carbon affixed to the soil particles will take a long time to degrade. So reducing the carbon by lowering the dose may not have resulted in an immediate change in the removal rates. FIG. 9 shows a graph that illustrates that removal rate of TN through the polishing filter.

Mixing the appropriate mass of carbon to the polishing filter influent caused the TN removal in the treated water as the water passed through the stratified filters. The design of the polishing filters mimics the stratifications of natural soil.

Description of the Polishing Filter

Figure 10:
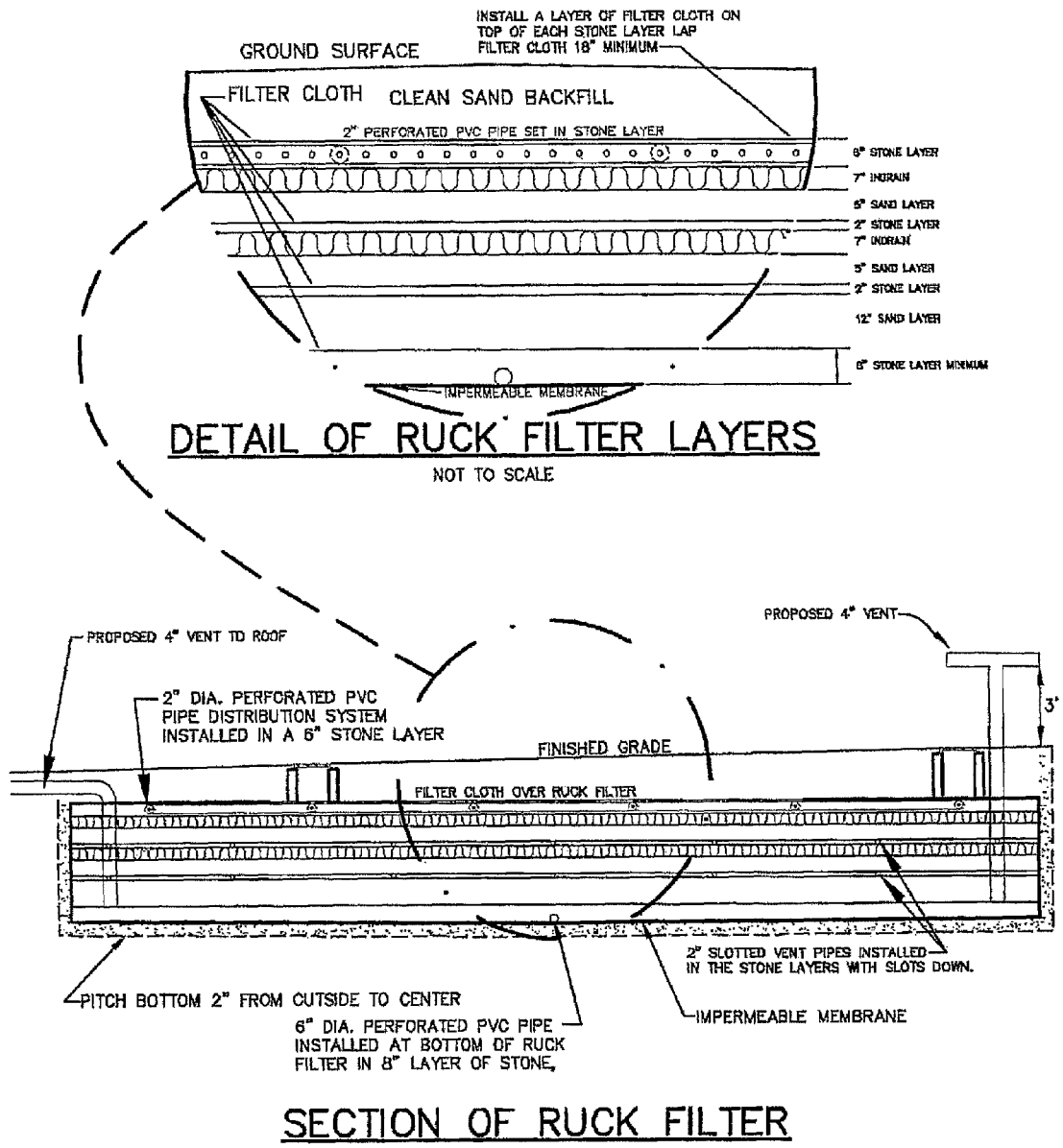
FIG. 10 is an illustration of a cross section of a RUCK™ polishing filter.
Figure 11:
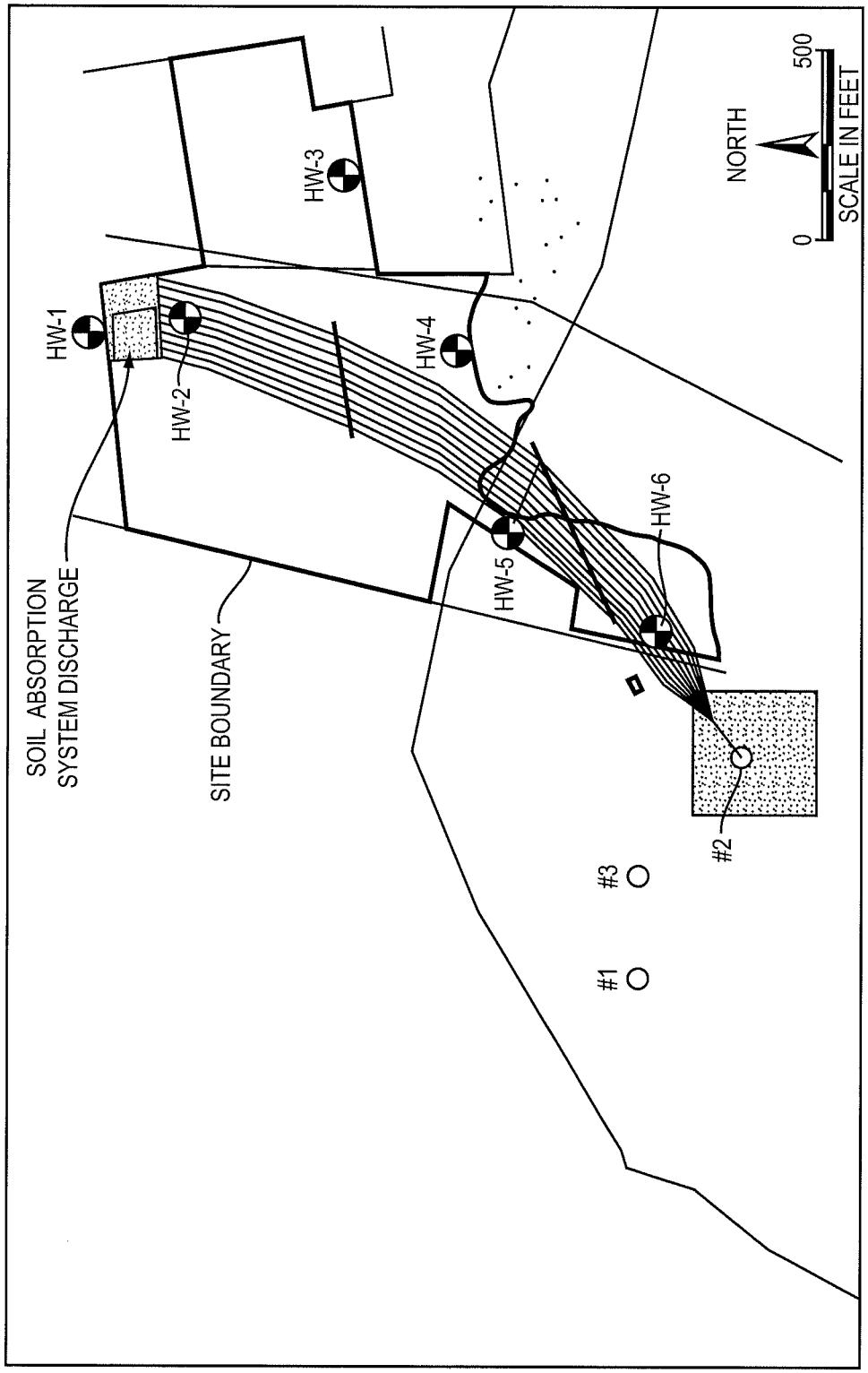
FIG. 11 is a schematic illustration of a projected plume in the ground water caused by the discharge of effluent from a soil absorption system according to this invention.

The polishing filters were constructed similar in cross section as a RUCK™ filter. A polishing filter consists of two layers of sand, modified with inserts called Indrains. At the bottom of each sand layer is a non-woven filter cloth. Crushed stone venting layers are installed between the sand layers. A cross section of the polishing filter is shown in FIG. 10. Starting at the top, there is a network of perforated distribution pipes installed in a crushed stone distribution layer; then a sand filter layer is installed on a nonwoven filter cloth, which is installed on top of a vented crushed stone layer; then there is a sand filter layer installed on a nonwoven filter cloth, which is installed on top of a vented crushed stone layer, then the lowest sand filter layer is installed on a nonwoven filter cloth, which is installed on top of a collection layer of crushed stone with a perforated pipe that drains the lowest layer and collects the effluent. The venting layers have a series of horizontal perforated pipes connected by solid vertical pipes to the atmosphere.

The Operation of the Polishing Filter

Denitrified fluid is periodically dosed to the top of the polishing filter. The pump station that doses the polishing filter has two pumps that alternately pump the denitrified fluid onto the top of the polishing filters. Mercury floats control the pumps. Such floats turn the pumps on and off based on the orientation of the float in the fluid. The pump control panel alternately energizes the pumps. The influent TN concentration will vary and the values were determined by testing. At the facility where the process was tested, the average TN concentration was usually about 8 mg/l, usually all in the form of TKN but with low concentrations of ammonia. The fluid percolates through the layers and drains at the bottom.

Both TSS and BOD$_5$ are removed as the fluid passes through this polishing filter. Removal rates of TSS and BOD$_5$ are very good and are explained further below. The mixing of the dissolved MicroC™ enhances the removal of TN. The final TN concentration is usually in the form of nitrate with about 38% of the mass expressed as a ratio of concentration being concentrations of TKN.

A timer doses MicroC™ by dripping the organic carbon into the influent water dropping in from the inlet. The ratio of COD to TN was adjusted over time. The nitrogen compounds in the influent water are almost always organic nitrogen. An operator gathered grab samples of the fluid in the pump station that dosed the polishing filter. The influent of the polishing filter had the characteristics shown in Tables 8-10.

TABLE 8

Biological Oxygen Demand (BOD$_5$) measured in mg/l

| | |
|---|---|
| High | 271 |
| Low | 34 |
| Average | 115 |
| Mean | 106 |
| Count of tests | 33 |

TABLE 9

Total Suspended Solids (TSS) measured in mg/l

| | |
|---|---|
| High | 488 |
| Low | 5 |
| Average | 48 |
| Mean | 27 |
| Count of tests | 33 |

TABLE 10

Total Nitrogen (Sum of TKN + Nitrite + Nitrate) in mg/l

| | |
|---|---|
| High | 15.3 |
| Low | 5.6 |
| Average | 10.2 |
| Mean | 9.0 |
| Count of tests | 8 |

The characteristics of the effluent from the polishing filter are the same as the final effluent characteristics. The polishing filter was very effective at removing TSS and BOD$_5$. The polishing filter removed about 45% of the TN, based on the difference in influent and effluent TN concentrations. The polishing filter and ultraviolet light removed most of the BOD$_5$. The filter usually removed TSS to low levels.

In summary, the mature polishing filter with a carbon to nitrogen ratio of around 3.8 COD/TN removed about half of the TN and most of the BOD$_5$ and TSS. The polishing filter provided significant redundancy in the performance of the system.

Test of Polishing Filter Efficiency

The results shown in Table 11 were obtained an analysis by a testing laboratory of samples gathered December 18 of Year Four. The sample of the influent was gathered by grab sample, with the final effluent sample taken by composite sampler.

TABLE 11

Typical Removal of TN in the Polishing Filter with the addition of MicroC ™

| 12/18/Four | TKN (mg/L) | NO$_3^-$ (mg/L) | NO$_2^-$ (mg/L) | TN (mg/L) | Removal % |
|---|---|---|---|---|---|
| Polishing Influent | 13.9 | 0.05* | 0.020* | 13.9 | |
| Final Effluent | 7.4 | 5.28 | 0.020* | 7.4 | 46.8% |

*Indicates test procedure's detection level since sample value was below.

As the above results demonstrate, the polishing filter removed about 47% of the total nitrogen.

EQUIVALENTS

While this invention has been particularly shown and described with references to example embodiments thereof, it will be understood by those skilled in the art that various changes in form and details may be made therein without departing from the scope of the invention encompassed by the appended claims.

What is claimed is:

1. A method for conducting a denitrification process in water that includes a total nitrogen content, comprising the steps of:
   a) mixing water having a total nitrogen concentration of less than 30 mg/l and a biochemical oxygen demand measured 5 days after the start of incubation of less than 30 mg/l with a sufficient amount of dissolved carbohydrate to cause reduction of the total nitrogen in the water, the ratio of dissolved carbon-to-nitrogen being in a range of between about two and a half to ten milligrams per liter of dissolved carbon of Chemical Oxygen Demand to about one milligram per liter of total nitrogen; and
   b) intermittently percolating the water and the dissolved carbohydrate through a stratified fixed bed, wherein the stratified fixed bed includes a packed bed filter of layers separated by nonwoven filter cloth, whereby the amount of dissolved carbohydrate is metabolized by bacteria in the stratified fixed bed by a denitrification process, thereby reducing the total nitrogen in the water.

2. The method of claim 1, wherein the water is treated wastewater.

3. The method of claim 1, wherein the average pore size of the fixed bed is in a range of between 0.1 mm and 20 mm.

4. The method of claim 1, wherein the residence time of the water in the fixed bed is in a range of between twelve hours and ten days.

5. The method of claim 1, wherein the average temperature of the water in the fixed bed is above 48 degrees Fahrenheit.

6. The method of claim 1, wherein the packed bed filter layers include at least one member selected from the group consisting of sand, stones, textile and plastic.

7. The method of claim 6, wherein each pair of the packed bed filter layers are separated by at least two layers of nonwoven filter cloth.

8. The method of claim 1, wherein the water is dosed through the stratified fixed bed.

* * * * *